(12) United States Patent
Lopatin et al.

(10) Patent No.: US 9,567,683 B2
(45) Date of Patent: *Feb. 14, 2017

(54) POROUS THREE DIMENSIONAL COPPER, TIN, COPPER-TIN, COPPER-TIN-COBALT, AND COPPER-TIN-COBALT-TITANIUM ELECTRODES FOR BATTERIES AND ULTRA CAPACITORS

(75) Inventors: Sergey D. Lopatin, Morgan Hill, CA (US); Dmitri A. Brevnov, Santa Clara, CA (US); Robert Z. Bachrach, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1128 days.

This patent is subject to a terminal disclaimer.

(21) Appl. No.: 13/486,202

(22) Filed: Jun. 1, 2012

(65) Prior Publication Data

US 2012/0237823 A1 Sep. 20, 2012

Related U.S. Application Data

(60) Division of application No. 12/696,422, filed on Jan. 29, 2010, now Pat. No. 8,206,569, and a
(Continued)

(51) Int. Cl.
*H01M 4/64* (2006.01)
*C25D 3/38* (2006.01)
(Continued)

(52) U.S. Cl.
CPC . *C25D 3/38* (2013.01); *C25D 5/10* (2013.01); *C25D 5/18* (2013.01); *C25D 5/48* (2013.01);
(Continued)

(58) Field of Classification Search
CPC ...... H01M 4/366; H01M 4/0438; H01M 4/38; H01M 4/661
(Continued)

(56) References Cited

U.S. PATENT DOCUMENTS 512,253 A 1/1894 Lockwood
4,551,210 A 11/1985 Parthasarathi
(Continued)

FOREIGN PATENT DOCUMENTS

CN 1957489 5/2007
JP 11-040148 2/1999
(Continued)

OTHER PUBLICATIONS

Search Report and Office Action Dated Jul. 1, 2013 for Chinese Application No. 201080014859.8.
(Continued)

*Primary Examiner* — Jonathan Jelsma
*Assistant Examiner* — Rashid Alam
(74) *Attorney, Agent, or Firm* — Patterson & Sheridan, LLP

(57) ABSTRACT

A method and apparatus for forming a reliable and cost efficient battery or electrochemical capacitor electrode structure that has an improved lifetime, lower production costs, and improved process performance are provided. In one embodiment a method for forming a three dimensional porous electrode for a battery or an electrochemical cell is provided. The method comprises depositing a columnar metal layer over a substrate at a first current density by a diffusion limited deposition process and depositing three dimensional metal porous dendritic structures over the columnar metal layer at a second current density greater than the first current density.

20 Claims, 10 Drawing Sheets

Related U.S. Application Data continuation-in-part of application No. 12/459,313, filed on Jun. 30, 2009, now Pat. No. 8,486,562.

(60) Provisional application No. 61/149,933, filed on Feb. 4, 2009, provisional application No. 61/156,862, filed on Mar. 2, 2009, provisional application No. 61/155,454, filed on Feb. 25, 2009.

(51) Int. Cl.
| | | |
|---|---|---|
| *C25D 5/10* | (2006.01) | |
| *C25D 5/18* | (2006.01) | |
| *C25D 5/48* | (2006.01) | |
| *C25D 17/00* | (2006.01) | |
| *H01M 4/04* | (2006.01) | |
| *H01M 4/36* | (2006.01) | |
| *H01M 4/38* | (2006.01) | |
| *H01M 4/66* | (2006.01) | |

(52) U.S. Cl.
CPC ............ *C25D 17/00* (2013.01); *H01M 4/0438* (2013.01); *H01M 4/366* (2013.01); *H01M 4/38* (2013.01); *H01M 4/661* (2013.01)

(58) Field of Classification Search
USPC .......................................................... 429/211
See application file for complete search history.

(56) References Cited

U.S. PATENT DOCUMENTS

| | | | |
|---|---|---|---|
| 4,663,256 A * | 5/1987 | Corrigan | 429/223 |
| 5,501,915 A | 3/1996 | Hards et al. | |
| 5,595,839 A | 1/1997 | Hossain | |
| 5,958,088 A | 9/1999 | Vu et al. | |
| 6,497,806 B1 | 12/2002 | Endo | |
| 6,746,591 B2 | 6/2004 | Zheng et al. | |
| 7,101,409 B2 | 9/2006 | Bowden et al. | |
| 7,160,531 B1 | 1/2007 | Jacques et al. | |
| 7,348,101 B2 | 3/2008 | Gozdz et al. | |
| 7,435,494 B1 | 10/2008 | Rogers et al. | |
| 2003/0036001 A1 | 2/2003 | James et al. | |
| 2003/0099884 A1 | 5/2003 | Chiang et al. | |
| 2003/0118884 A1 | 6/2003 | Hampden-Smith et al. | |
| 2003/0143837 A1 | 7/2003 | Gandikota et al. | |
| 2004/0013812 A1 | 1/2004 | Kollmann et al. | |
| 2004/0224231 A1 | 11/2004 | Fujimoto et al. | |
| 2005/0006245 A1 | 1/2005 | Sun et al. | |
| 2005/0175900 A1* | 8/2005 | Yasuda | H01M 4/043 |
| | | | 429/231.95 |
| 2006/0283716 A1 | 12/2006 | Hafezi et al. | |
| 2007/0059584 A1 | 3/2007 | Nakano et al. | |
| 2007/0099072 A1* | 5/2007 | Hennige et al. | 429/144 |
| 2007/0148888 A1 | 6/2007 | Krull et al. | |
| 2007/0194467 A1 | 8/2007 | Yang et al. | |
| 2008/0063939 A1* | 3/2008 | Ryu et al. | 429/209 |
| 2008/0092947 A1 | 4/2008 | Lopatin et al. | |
| 2008/0248189 A1* | 10/2008 | Ohtsuka | H01M 4/0423 |
| | | | 427/58 |
| 2008/0248388 A1 | 10/2008 | Ohtsuka et al. | |
| 2008/0261096 A1 | 10/2008 | Kollmann et al. | |
| 2009/0280407 A1 | 11/2009 | Ito et al. | |
| 2009/0316335 A1 | 12/2009 | Simon et al. | |
| 2010/0126849 A1 | 5/2010 | Lopatin et al. | |
| 2010/0200403 A1 | 8/2010 | Lopatin et al. | |
| 2010/0216026 A1 | 8/2010 | Lopatin et al. | |
| 2010/0316907 A1* | 12/2010 | Yamamoto et al. | 429/188 |
| 2010/0330425 A1 | 12/2010 | Lopatin et al. | |

FOREIGN PATENT DOCUMENTS

| | | |
|---|---|---|
| JP | 2002-170557 | 6/2002 |
| JP | 2006134894 A | 5/2006 |
| JP | 2007-080609 | 3/2007 |
| JP | 2008098094 A | 4/2008 |
| KR | 1020070062675 A | 6/2007 |
| WO | WO 2006-123049 A2 | 11/2006 |
| WO | WO 2008-078755 A1 | 7/2008 |

OTHER PUBLICATIONS

Barker article, "Lithium-ion Active Materials." pp. 1-10. Jun. 2008.
D. Larcher et al article, "In Situ X-Ray Study of the Electrochemical Reation of Li with η'—Cu$_6$Sn$_5$." Journal of the Electrochemical Society, 147(5), 1658-1662 (2000).
International Search Report and Written Opinion of the International Searching Authority mailed Apr. 26, 2011 in PCT/US2010/040385.
International Search Report and Written Opinion of the International Searching Authority mailed Sep. 13, 2010 in PCT/US2010/022597.
International Search Report. PCT/US2010/023640 dated Nov. 30, 2010.
Jokiniemi presentatiion, "ActCom-Active NanoComposite Materials for Li-ion Cells" pp. 1-19.
Morrison article, "New Materials Extend Li-Ion Performance." Power Electronics Technology, Jan. 2006, pp. 50-52.
Quan Fan et al article, "Nanosized Amorphous Materials as Anodes for Lithium Batteries." Mater. Res. Soc. Symp. Proc., vol. 972, 2007, Materials Research Society.
S.D. Beattie et al article, "Single Bath, Pulsed Electrodeposition of Copper-Tin Alloy Negative Electrodes for Lithium-ion Batteries." Journal of the Electrochemical Society, 150(7), A894-A898 (2003).
S.D. Beattie et al article, "Single Bath, Electrodeposition of a Combinatorial Library of Binary Cu$_{1-x}$Sn$_x$ Alloys." Journal of the Electrochemical Society, 150(7) C457-C460 (2003).
Trahey et al article, "High-Capacity, Microporous Cu6Sn5—Sn Anodes for Li-Ion Batters." Journal of the Electrochemical Society, 156 (5) A385-A389 (2009).
Whittingham presentation, "Nanostructured Materials as Anodes." Feb. 27, 2008, pp. 1-3.
Winter et al article, "Electrochemical Lithiation of Tin and Tin-Based Intermetallics and Composites." Electrochimica Acta (1999), pp. 31-50.
Office Action for Korean Application No. 10-2011-7020743 dated Mar. 25, 2016.

\* cited by examiner

Plating on Foil Substrate
3D CuSn Plated on Cu Foil

POROUS THREE DIMENSIONAL COPPER, TIN, COPPER-TIN, COPPER-TIN-COBALT, AND COPPER-TIN-COBALT-TITANIUM ELECTRODES FOR BATTERIES AND ULTRA CAPACITORS

CROSS-REFERENCE TO RELATED APPLICATIONS

This application is a divisional of U.S. patent application Ser. No. 12/696,422, filed Jan. 29, 2010 now U.S. Pat. No. 8,206,569, which claims benefit of U.S. Provisional Patent Application Ser. No. 61/149,933, filed Feb. 4, 2009, and is a continuation-in-part of U.S. patent application Ser. No. 12/459,313, filed Jun. 30, 2009 now U.S. Pat. No. 8,486,562, which claims the benefit of U.S. Provisional Patent Application Ser. No. 61/156,862, filed Mar. 2, 2009 and U.S. Provisional Patent Application Ser. No. 61/155,454, filed Feb. 25, 2009, all of which are herein incorporated by reference.

BACKGROUND OF THE INVENTION

Field of the Invention

Embodiments of the present invention generally relate to methods of forming an energy storage device. More particularly, embodiments described herein relate to methods of forming electric batteries and electrochemical capacitors.

Description of the Related Art

Fast-charging, high-capacity energy storage devices, such as supercapacitors and lithium- (Li) ion batteries, are used in a growing number of applications, including portable electronics, medical, transportation, grid-connected large energy storage, renewable energy storage, and uninterruptible power supply (UPS). In modern rechargeable energy storage devices, the current collector is made of an electric conductor. Examples of materials for the positive current collector (the cathode) include aluminum, stainless steel, and nickel. Examples of materials for the negative current collector (the anode) include copper (Cu), stainless steel, and nickel (Ni). Such collectors can be in the form of a foil, a film, or a thin plate, having a thickness that generally ranges from about 6 to 50 µm.

The active electrode material in the positive electrode of a Li-ion battery is typically selected from lithium transition metal oxides, such as $LiMn_2O_4$, $LiCoO_2$, and combinations of Ni or Li oxides and includes electroconductive particles, such as carbon or graphite, and binder material. Such positive electrode material is considered to be a lithium-intercalation compound, in which the quantity of conductive material is in the range from 0.1% to 15% by weight.

Graphite is usually used as the active electrode material of the negative electrode and can be in the form of a lithium-intercalation meso-carbon micro beads (MCMB) powder made up of MCMBs having a diameter of approximately 10 µm. The lithium-intercalation MCMB powder is dispersed in a polymeric binder matrix. The polymers for the binder matrix are made of thermoplastic polymers including polymers with rubber elasticity. The polymeric binder serves to bind together the MCMB material powders to preclude crack formation and prevent disintegration of the MCMB powder on the surface of the current collector. The quantity of polymeric binder is in the range of 2% to 30% by weight.

The separator of Li-ion batteries is typically made from micro-porous polyethylene and polyolefin, and is applied in a separate manufacturing step.

For most energy storage applications, the charge time and capacity of energy storage devices are important parameters. In addition, the size, weight, and/or expense of such energy storage devices can be significant limitations. The use of electroconductive particles and MCMB powders and their associated binder materials in energy storage devices has a number of drawbacks. Namely, such materials limit the minimum size of the electrodes constructed from such materials, produce unfavorable internal resistance in an energy storage device, and require complex and eclectic manufacturing methods.

Accordingly, there is a need in the art for faster charging, higher capacity energy storage devices that are smaller, lighter, and can be more cost effectively manufactured.

SUMMARY OF THE INVENTION

Embodiments described herein generally relate to methods of forming an energy storage device. More particularly, embodiments described herein relate to methods of forming electric batteries and electrochemical capacitors. In one embodiment a method for forming a porous electrode for an electrochemical cell is provided. The method comprises depositing a columnar metal layer over a substrate at a first current density by a diffusion limited deposition process and depositing three dimensional metal porous dendritic structures over the columnar metal layer at a second current density greater than the first current density.

In another embodiment, a method of forming a porous three dimensional electrode microstructure for an electrochemical cell is provided. The method comprises positioning a substrate in a plating solution, depositing a columnar metal layer over the substrate at a first current density by a diffusion limited deposition process, and depositing porous conductive dendritic structures over the columnar metal layer at a second current density greater than the first current density.

In yet another embodiment a battery or an electrochemical capacitor is provided. The battery or electrochemical capacitor comprises a separator, a collector, and a porous electrode. The porous electrode comprises a columnar metal layer and three dimensional metal porous dendritic structures formed over the columnar metal layer.

In yet another embodiment, a substrate processing system for processing a vertically oriented flexible substrate is provided. The substrate processing system comprises a first plating chamber configured to plate a conductive microstructure comprising a first conductive material over a portion of the vertically oriented conductive substrate, a first rinse chamber disposed adjacent to the first plating chamber configured to rinse and remove any residual plating solution from the portion of the vertically oriented conductive substrate with a rinsing fluid, a second plating chamber disposed adjacent to the first rinse chamber configured to deposit a second conductive material over the conductive microstructure, a second rinse chamber disposed adjacent to the second plating chamber configured to rinse and remove any residual plating solution from the portion of the vertically oriented conductive substrate, a substrate transfer mechanism configured to transfer the vertically oriented flexible substrate among the chambers, wherein each of the chambers comprises a processing volume, a feed roll disposed outside the processing volume and configured to retain a portion of the vertically oriented flexible base, and a take up roll disposed outside the processing volume and configured to retain a portion of the vertically oriented flexible base, wherein the substrate transfer mechanism is configured to activate the feed rolls and the take up rolls to move the vertically oriented flexible substrate in and out of each chamber, and hold the vertically oriented flexible substrate in the processing volume of each chamber.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1A:
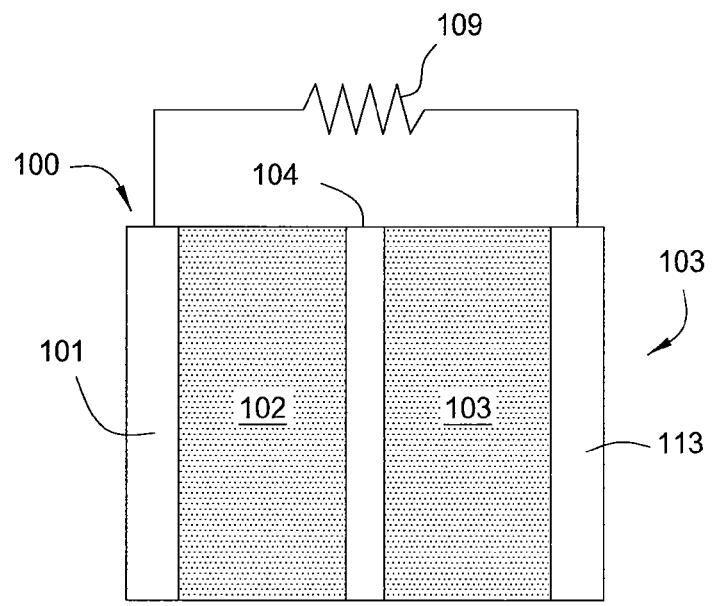
FIG. 1A illustrates a simplified schematic view of a lithium-ion battery cell according to embodiments described herein.

To facilitate understanding, identical reference numerals have been used, wherever possible, to designate identical elements that are common to the figures. It is contemplated that elements and/or process steps of one embodiment may be beneficially incorporated in other embodiments without additional recitation.

DETAILED DESCRIPTION

Embodiments described herein generally relate to an electrode structure useful in a battery or an electrochemical capacitor and the methods of creating such an electrode structure that has an improved lifetime, lower production costs, and improved process performance. Embodiments described herein generally include a porous 3-dimensional electrode structure with increased surface area. In one embodiment, the electrode structure comprises a columnar metal layer and three dimensional metal porous conductive dendritic structures formed over the columnar metal layer. One embodiment described herein is a method of forming a porous electrode structure by depositing a columnar metal layer and depositing three dimensional metal porous dendritic structures on the columnar metal layer by a diffusion limited electrochemical deposition process brought on by adjusting the electrochemical process parameters, such as electrolyte chemistry, applied voltage, applied current, and/or fluid dynamic properties at the plating surface to achieve a desired deposition morphology.

In an effort to achieve desirable plated film morphology or film properties, it is often desirable to increase the concentration of metal ions near the cathode (e.g., seed layer surface) by reducing the diffusion boundary layer or by increasing the metal ion concentration in the electrolyte bath. It should be noted that the diffusion boundary layer is strongly related to the hydrodynamic boundary layer. If the metal ion concentration is too low and/or the diffusion boundary layer is too large at a desired plating rate the limiting current ($i_L$) will be reached. The diffusion limited plating process created when the limiting current is reached, prevents the increase in plating rate by the application of more power (e.g., voltage) to the cathode (e.g., metalized substrate surface). When the limiting current is reached a low density columnar film is produced due to the evolution of gas and resulting dendritic type film growth that occurs due to the mass transport limited process.

While the particular apparatus in which the embodiments described herein can be practiced is not limited, it is particularly beneficial to practice the embodiments on a web-based roll-to-roll system sold by Applied Materials, Inc., Santa Clara, Calif. Exemplary roll-to-roll and discrete substrate systems on which the embodiments described herein may be practiced are described herein and in further detail in U.S. Provisional Patent Application Ser. No. 61/243,813, titled APPARATUS AND METHODS FOR FORMING ENERGY STORAGE OR PV DEVICES IN A LINEAR SYSTEM and U.S. patent application Ser. No. 12/620,788, titled APPARATUS AND METHOD FOR FORMING 3D NANOSTRUCTURE ELECTRODE FOR ELECTROCHEMICAL BATTERY AND CAPACITOR, all of which are herein incorporated by reference in their entirety.

FIG. 1A is a schematic illustration of a Li-ion battery 100 electrically connected to a load 109 according to embodiments described herein. The primary functional components of Li-ion battery 100 include a current collector 101, an anode structure 102, a cathode structure 103, a separator 104, and an electrolyte (not shown). The electrolyte is contained in anode structure 102, cathode structure 103, and separator 104, and a variety of materials may be used as electrolyte, such as a lithium salt in an organic solvent. In operation, Li-ion battery 100 provides electrical energy, i.e., is discharged, when anode structure 102 and cathode structure 103 are electrically coupled to load 109, as shown in FIG. 1A. Electrons flow from current collector 101 through load 109 to current collector 113 of cathode structure 103, and lithium ions move from the anode structure 102, through separator 104, and into cathode structure 103.

Figure 1B:
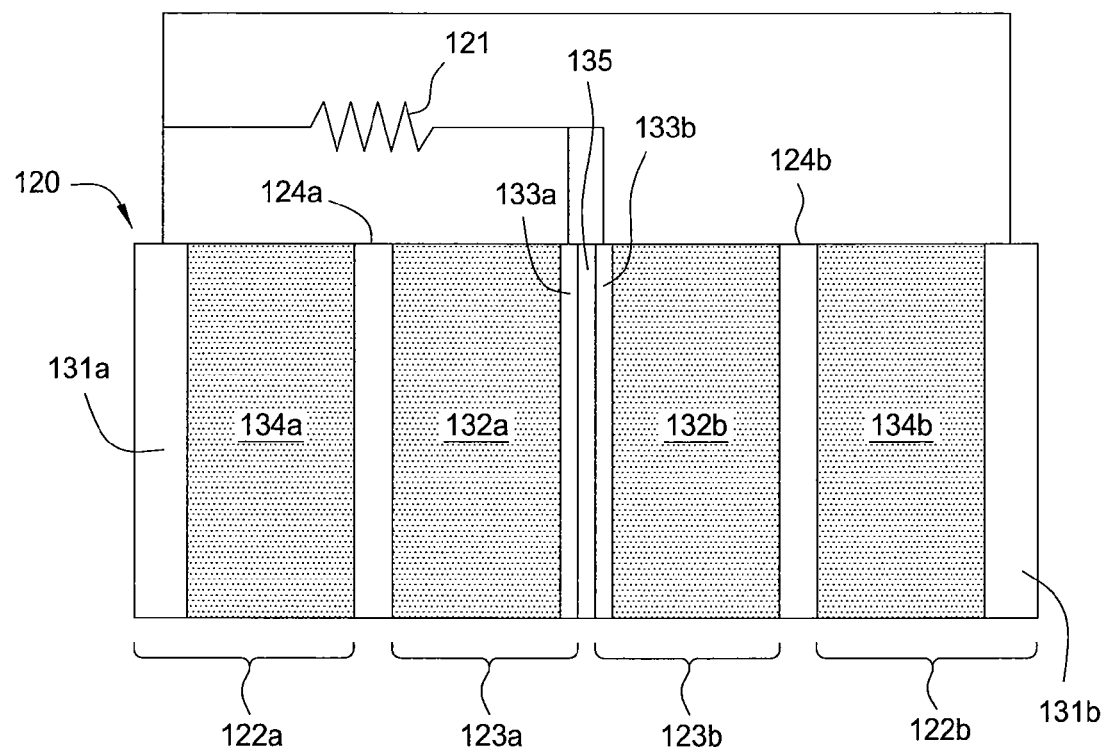
FIG. 1B illustrates a simplified schematic view of a single sided Li-ion battery cell bi-layer electrically connected to a load according to embodiments described herein.

FIG. 1B is a schematic diagram of a single sided Li-ion battery cell bi-layer 120 with anode structures 122a, 122b electrically connected to a load 121, according to one embodiment described herein. The single sided Li-ion battery cell bi-layer 120 functions similarly to the Li-ion battery 100 depicted in FIG. 1A. The primary functional components of Li-ion battery cell bi-layer 120 include anode structures 122a, 122b, cathode structures 123a, 123b, separator layers 124a, 124b, and an electrolyte (not shown) disposed within the region between the current collectors 131a, 131b, 133a, and 133b. The Li-ion battery cell 120 is hermetically sealed with electrolyte in a suitable package with leads for the current collectors 131a, 131b, 133a, and 133b. The anode structures 122a, 122b, cathode structures 123a, 123b, and fluid-permeable separator layers 124a, 124b are immersed in the electrolyte in the region formed between the current collectors 131a and 133a and the region formed between the current collectors 131b and 133b. An insulator layer 135 is disposed between current collector 133a and current collector 133b.

Anode structures 122a, 122b and cathode structures 123a, 123b each serve as a half-cell of Li-ion battery cell 120, and together form a complete working bi-layer cell of Li-ion battery 120. Anode structures 122a, 122b each include a metal current collector 131a, 131b and a first electrolyte containing material 134a, 134b. Similarly, cathode structures 123a, 123b include a current collector 133a and 133b respectively and a second electrolyte containing material 132a, 132b, such as a metal oxide, for retaining lithium ions. The current collectors 131a, 131b, 133a, and 133b are made of electrically conductive material such as metals. In some cases, a separator layer 124a, 124b, which is an insulating, porous, fluid-permeable layer, for example, a dielectric layer, may be used to prevent direct electrical contact between the components in the anode structures 122a, 122b and the cathode structures 123a, 123b.

The electrolyte containing porous material on the cathode side of the Li-ion battery 100, or positive electrode, may comprise a lithium-containing metal oxide, such as lithium cobalt dioxide ($LiCoO_2$) or lithium manganese dioxide ($LiMnO_2$). The electrolyte containing porous material may be made from a layered oxide, such as lithium cobalt oxide, an olivine, such as lithium iron phosphate, or a spinel, such as lithium manganese oxide. In non-lithium embodiments, an exemplary cathode may be made from $TiS_2$ (titanium disulfide). Exemplary lithium-containing oxides may be layered, such as lithium cobalt oxide ($LiCoO_2$), or mixed metal oxides, such as $LiNi_xCo_{1-2x}MnO_2$, $LiNi_{0.5}Mn_{1.5}O_4$, $Li(Ni_{0.8}Co_{0.15}Al_{0.05})O_2$, $LiMn_2O_4$. Exemplary phosphates may be iron olivine ($LiFePO_4$) and it is variants (such as $LiFe_{1-x}MgPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The electrolyte containing porous material on the anode side of the Li-ion battery 100, or negative electrode, may be made from materials described above, for example, graphitic particles dispersed in a polymer matrix and/or various fine powders, for example, micro-scale or nano-scale sized powders. Additionally, microbeads of silicon, tin, or lithium titanate ($Li_4Ti_5O_{12}$) may be used with, or instead of, graphitic microbeads to provide the conductive core anode material. It should also be understood that the embodiments described herein are not limited to the Li-ion battery cells depicted in FIGS. 1A and 1B. It should also be understood, that the anode structures and the cathode structures may be connected either in series or in parallel.

Figure 2A:
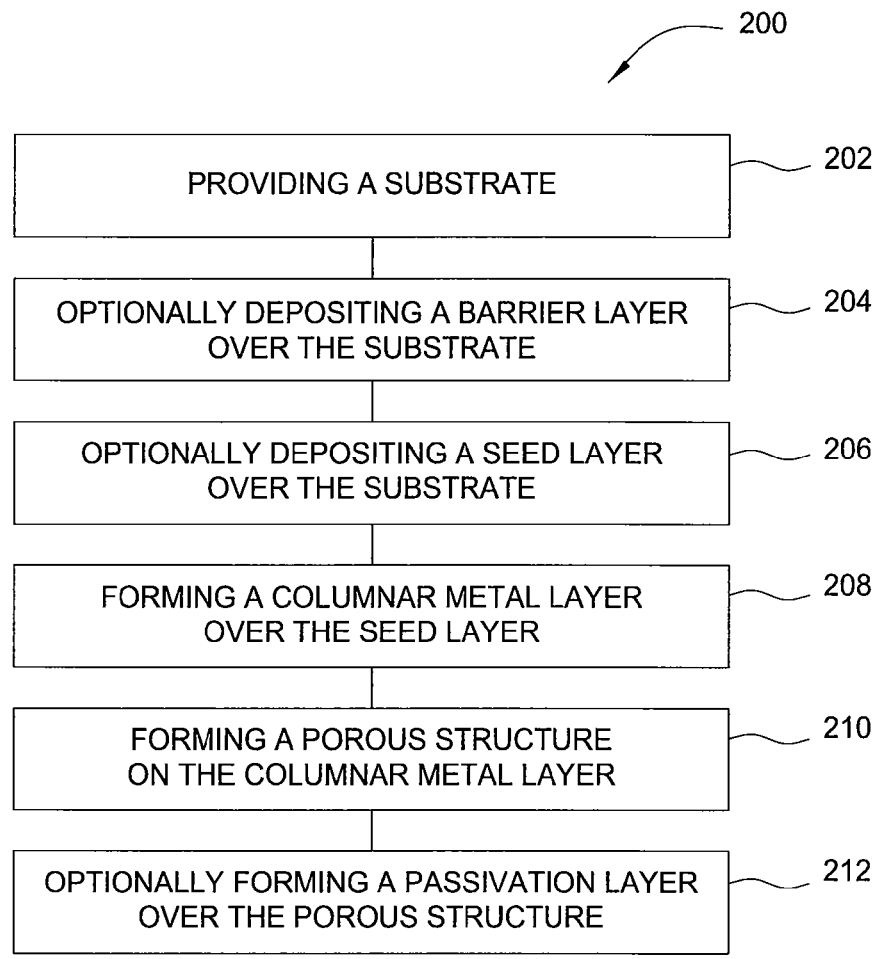
FIG. 2A is a flow diagram of a method for forming an anode according to embodiments described herein.

FIG. 2A is a flow diagram according to one embodiment described herein of a process 200 for forming a porous three dimensional conductive electrode in accordance with embodiments described herein. FIGS. 3A-3F are schematic cross-sectional views of a porous three dimensional conductive electrode formed according to embodiments described herein. The process 200 includes process steps 202-212, wherein a porous electrode is formed on a substrate 300. In one embodiment, the process 200 may be performed as a roll-to-roll manufacturing process. The first process step 202 includes providing the substrate 300. In one embodiment, the substrate 300 may comprise a material selected from the group comprising or consisting of copper, aluminum, nickel, zinc, tin, titanium, flexible materials, stainless steel, and combinations thereof. In one embodiment, the substrate 300 is a flexible substrate comprising a material selected from the group comprising or consisting of copper, aluminum, nickel, zinc, tin, stainless steel, and combinations thereof. In one embodiment, the substrate is a copper foil substrate. In one embodiment, the substrate 300 has layers deposited thereon. In one embodiment, the layers are selected from the group comprising or consisting of copper, titanium, chromium, alloys thereof, and combinations thereof.

Flexible substrates can be constructed from polymeric materials, such as a polyimide (e.g., KAPTON™ by DuPont Corporation), polyethyleneterephthalate (PET), polyacrylates, polycarbonate, silicone, epoxy resins, silicone-functionalized epoxy resins, polyester (e.g., MYLAR™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylenenaphthalene (PEN). In some cases the substrate can be constructed from a metal foil, such as stainless steel that has an insulating coating disposed thereon. Alternately, flexible substrate can be constructed from a relatively thin glass that is reinforced with a polymeric coating.

In one embodiment, the substrate may be roughened by chemically treating the surface of the substrate to increase the surface area.

The second process step 204 includes optionally depositing a barrier layer and/or adhesion layer 302 over the substrate. The barrier layer 302 may be deposited to prevent or inhibit diffusion of subsequently deposited materials over the barrier layer into the underlying substrate. In one embodiment the barrier layer comprises multiple layers such as a barrier-adhesion layer or an adhesion-release layer. Examples of barrier layer materials include refractory metals and refractory metal nitrides such as chromium, tantalum (Ta), tantalum nitride ($TaN_x$), titanium (Ti), titanium nitride ($TiN_x$), tungsten (W), tungsten nitride ($WN_x$), alloys thereof, and combinations thereof. Other examples of barrier layer materials include PVD titanium stuffed with nitrogen, doped silicon, aluminum, aluminum oxides, titanium silicon nitride, tungsten silicon nitride, and combinations thereof. Exemplary barrier layers and barrier layer deposition techniques are further described in U.S. Patent Application Publication 2003/0143837 entitled "Method of Depositing A Catalytic Seed Layer," filed on Jan. 28, 2002, which is incorporated herein by reference to the extent not inconsistent with the embodiments described herein.

The barrier layer may be deposited by CVD techniques, PVD techniques, electroless deposition techniques, evaporation, or molecular beam epitaxy. The barrier layer may also be a multi-layered film deposited individually or sequentially by the same or by a combination of techniques.

Physical vapor deposition techniques suitable for the deposition of the barrier layer include techniques such as high density plasma physical vapor deposition (HDP PVD) or collimated or long throw sputtering. One type of HDP PVD is ionized metal plasma physical vapor deposition (IMP PVD). An example of a chamber capable of IMP PVD of a barrier layer is an IMP VECTRA™ chamber. The chamber and process regime are available from Applied Materials, Inc. of Santa Clara, Calif. Generally, IMP PVD involves ionizing a significant fraction of material sputtered from a metal target to deposit a layer of the sputtered material on a substrate. Power supplied to a coil in the chamber enhances the ionization of the sputtered material. The ionization enables the sputtered material to be attracted in a substantially perpendicular direction to a biased substrate surface and to deposit a layer of material with good step coverage over high aspect ratio features. The chamber may also include a reactive processing gas, such as nitrogen for the deposition of a metal nitride. An exemplary process for the deposition of barrier layers utilizing physical vapor deposition is more fully described in co-pending U.S. patent application Ser. No. 09/650,108, entitled, "Method For Achieving Copper Fill Of High Aspect Ratio Interconnect Features," filed on Aug. 29, 2000, issued as U.S. Pat. No. 6,436,267 which is incorporated herein by reference to the extent not inconsistent with the invention.

An example of a chamber capable of chemical vapor deposition of a barrier layer is a CVD TxZ™ chamber. The chamber and the process regime are available from Applied Materials, Inc. of Santa Clara, Calif. Generally, chemical vapor deposition involves flowing a metal precursor into the chamber. The metal precursor chemically reacts to deposit a metal film on the substrate surface. Chemical vapor deposition may further include utilizing a plasma to aid in the deposition of the metal film on the substrate surface. Exemplary processes for the deposition of barrier layers from metal precursors are more fully described in co-pending U.S. patent application Ser. No. 09/505,638, entitled, "Chemical Vapor Deposition of Barriers From Novel Precursors," filed on Feb. 16, 2000, issued as U.S. Pat. No. 6,743,473 on Jun. 1, 2004, and in U.S. patent application Ser. No. 09/522,726, entitled, "MOCVD Approach To Deposit Tantalum Nitride Layers," filed on Mar. 10, 2000, both incorporated herein by reference to the extent not inconsistent with the invention. In addition, the PVD chamber and/or the CVD chamber can be integrated into a processing platform, such as an ENDURA™ platform, also available from Applied Materials, Inc. of Santa Clara, Calif.

An example of a processing tool capable of roll-to-roll evaporation of a barrier layer is the SMARTWEB™ vacuum web coater available from Applied Materials, Inc. of Santa Clara, Calif. Generally evaporation involves placing the material to be deposited or source material in a chamber or crucible and heating in a vacuum environment until the material vaporizes. One method of heating involves using an electron beam to heat the material. The use of a high vacuum environment increases the mean free path of the vapor molecules allowing the vapor to travel in a straight path with minimal collisions until the vapor strikes a surface and condenses to form a film. The rate of removal from the source material varies with vapor pressure which correspondingly varies with temperature. For example, as the vapor pressure increases which generally corresponds to an increase in temperature, the rate of removal from the source material also increases. Films which may be deposited using evaporation methods include films containing Copper (Cu), Chromium (Cr), Titanium (Ti), alloys thereof, combinations thereof, and Titanium Nitride (TiN).

The third process step 206 includes optionally depositing a seed layer 304 over the substrate 300. The seed layer 304 comprises a conductive metal that aids in subsequent deposition of materials thereover. The seed layer 304 preferably comprises a copper seed layer or alloys thereof. Other metals, particularly noble metals, may also be used for the seed layer. The seed layer 304 may be deposited over the barrier layer by techniques conventionally known in the art including physical vapor deposition techniques, chemical vapor deposition techniques, and electroless deposition techniques.

Physical vapor deposition techniques suitable for the deposition of the seed layer include techniques such as high density plasma physical vapor deposition (HDP PVD) or collimated or long throw sputtering. One type of HDP PVD is ionized metal plasma physical vapor deposition (IMP PVD). An example of a chamber capable of ionized metal plasma physical vapor deposition of a seed layer is an IMP Vectra™ chamber. The chamber and process regime are available from Applied Materials, Inc. of Santa Clara, Calif. An exemplary process for the deposition of a seed layer utilizing PVD techniques is more fully described in co-pending U.S. patent application Ser. No. 09/650,108, entitled, "Method For Achieving Copper Fill of High Aspect Ratio Interconnect Features," filed on Aug. 29, 2000, which is incorporated herein by reference to the extent not inconsistent with the invention. An example of a chamber capable of chemical vapor deposition of the seed layer is a CVD TxZ™ chamber. The chamber and the process regime are also available from Applied Materials, Inc. of Santa Clara, Calif. An exemplary process for the deposition of a seed layer utilizing CVD techniques is more fully described in U.S. Pat. No. 6,171,661 entitled "Deposition of Copper With Increased Adhesion," issued on Jan. 9, 2001.

The fourth process step 208 includes forming a columnar metal layer 306 over the seed layer 304. In certain embodiments, the columnar metal layer 306 is formed directly on a surface of the substrate 300. Formation of the columnar metal layer 306 includes establishing process conditions under which evolution of hydrogen results in the formation of a porous metal film. In one embodiment, such process conditions are achieved by performing at least one of: increasing the concentration of metal ions near the cathode (e.g., seed layer surface) by reducing the diffusion boundary layer, and by increasing the metal ion concentration in the electrolyte bath. It should be noted that the diffusion boundary layer is strongly related to the hydrodynamic boundary layer. If the metal ion concentration is too low and/or the diffusion boundary layer is too large at a desired plating rate the limiting current ($i_L$) will be reached. The diffusion limited plating process created when the limiting current is reached, prevents the increase in plating rate by the application of more power (e.g., voltage) to the cathode (e.g., metalized substrate surface). When the limiting current is reached a low density columnar metal layer 306 is produced due to the evolution of gas and resulting dendritic type film growth that occurs due to the mass transport limited process.

Plating Solutions:

Formation of the columnar metal layer 306 generally takes place in a processing chamber. A processing chamber that may be adapted to perform one or more of the process steps described herein may include an electroplating chamber, such as the SLIMCELL® electroplating chamber available from Applied Materials, Inc. of Santa Clara, Calif. Other processing chambers and systems, including those available from other manufactures may also be used to practice the embodiments described herein. One exemplary processing system includes a roll-to-roll processing system described herein.

The processing chamber includes a suitable plating solution. Suitable plating solutions that may be used with the processes described herein include electrolyte solutions containing a metal ion source, an acid solution, and optional additives.

In one embodiment, to increase planarization power, the plating solution used in step 208 contains at least one or more acid solutions. Suitable acid solutions include, for example, inorganic acids such as sulfuric acid, phosphoric acid, pyrophosphoric acid, perchloric acid, acetic acid, citric acid, combinations thereof, as well as acid electrolyte derivatives, including ammonium and potassium salts thereof.

Optionally, the plating solution may include one or more additive compounds. Additive compounds include electrolyte additives including, but not limited to, suppressors, enhancers, levelers, brighteners and stabilizers to improve the effectiveness of the plating solution for depositing metal, namely copper to the substrate surface. For example, certain additives may be used to control the mechanism of bubble formation. Certain additives may decrease the ionization rate of the metal atoms, thereby inhibiting the dissolution process, whereas other additives may provide a finished, shiny substrate surface. The additives may be present in the plating solution in concentrations up to about 15% by weight or volume, and may vary based upon the desired result after plating. Optional additives include polyethylene glycol (PEG), polyethylene glycol derivatives, polyamides, polyimides including polyethyleneimide, polyglycine, 2-amino-1-napthalenesulfonic acid, 3-amino-1-propane-sulfonic acid, 4-aminotoluene-2-sulfonic acid, polyacrylamide, polyacrylic acid polymers, polycarboxylate copolymers, coconut diethanolamide, oleic diethanolamide, ethanolamide derivatives, sulfur containing compounds such as sulfite or di-sulfite, and combinations thereof.

In one embodiment, the metal ion source within the plating solution used in step 208 is a copper ion source. In one embodiment, the concentration of copper ions in the electrolyte may range from about 0.1 M to about 1.1M, preferably from about 0.4 M to about 0.9 M. Useful copper sources include copper sulfate ($CuSO_4$), copper chloride ($CuCl_2$), copper acetate ($Cu(CO_2CH_3)_2$), copper pyrophosphate ($Cu_2P_2O_7$), copper fluoroborate ($Cu(BF_4)_2$), derivatives thereof, hydrates thereof or combinations thereof. The electrolyte composition can also be based on the alkaline copper plating baths (e.g., cyanide, glycerin, ammonia, etc) as well.

In one example, the electrolyte is an aqueous solution that contains between about 200 and 250 g/l of copper sulfate pentahydrate ($CuSO_4.5(H_2O)$), between about 40 and about 70 g/l of sulfuric acid ($H_2SO_4$), and about 0.04 g/l of hydrochloric acid (HCl). In some cases it is desirable to add a low cost pH adjusting agent, such as potassium hydroxide (KOH) or sodium hydroxide (NaOH) to form an inexpensive electrolyte that has a desirable pH to reduce the cost of ownership required to form a metal contact structure for a solar cell. In some cases it is desirable to use tetramethylammonium hydroxide (TMAH) to adjust the pH.

In another example, the electrolyte is an aqueous solution that contains between about 220 and 250 g/l of copper fluoroborate ($Cu(BF_4)_2$), between about 2 and about 15 g/l of tetrafluoroboric acid ($HBF_4$), and about 15 and about 16 g/l of boric acid ($H_3BO_3$). In some cases it is desirable to add a pH adjusting agent, such as potassium hydroxide (KOH), or sodium hydroxide (NaOH) to form an inexpensive electrolyte that has a desirable pH to reduce the cost of ownership required to form a metal contact structure for a solar cell. In some cases it is desirable to use tetramethylammonium hydroxide (TMAH) to adjust the pH.

In yet another example, the electrolyte is an aqueous solution that contains between about 60 and about 90 g/l of copper sulfate pentahydrate ($CuSO_4.5(H_2O)$), between about 300 and about 330 g/l of potassium pyrophosphate ($K_4P_2O_7$), and about 10 to about 35 g/l of 5-sulfosalicylic acid dehydrate sodium salt ($C_7H_5O_6SNa.2H_2O$). In some cases it is desirable to add a pH adjusting agent, such as potassium hydroxide (KOH), or sodium hydroxide (NaOH) to form an inexpensive electrolyte that has a desirable pH to reduce the cost of ownership required to form a metal contact structure for a solar cell. In some cases it is desirable to use tetramethylammonium hydroxide (TMAH) to adjust the pH.

In yet another embodiment, the electrolyte is an aqueous solution that contains between about 30 and about 50 g/l of copper sulfate pentahydrate ($CuSO_4.5(H_2O)$), and between about 120 and about 180 g/l of sodium pyrophosphate decahydrate ($Na_4P_2O_7.10(H_2O)$). In some cases it is desirable to add a pH adjusting agent, such as potassium hydroxide (KOH), or sodium hydroxide (NaOH) to form an inexpensive electrolyte that has a desirable pH to reduce the cost of ownership required to form a metal contact structure for a solar cell. In some cases it is desirable to use tetramethylammonium hydroxide (TMAH) to adjust the pH.

In one embodiment, it may be desirable to add a second metal ion to the primary metal ion containing electrolyte bath (e.g., copper ion containing bath) that will plate out or be incorporated in the growing electrochemically deposited layer or on the grain boundaries of the electrochemically deposited layer. The formation of a metal layer that contains a percentage of a second element can be useful to reduce the intrinsic stress of the formed layer and/or improve its electrical and electromigration properties. In one example, it is desirable to add an amount of a silver (Ag), nickel (Ni), zinc (Zn), tin (Sn), or lithium (Li) metal ion source to a copper plating bath to form a copper alloy that has between about 1% and about 4% of the second metal in the deposited layer.

In one example, the metal ion source within the electrolyte solution used in step 208 is a silver, tin, zinc or nickel ion source. In one embodiment, the concentration of silver, tin, zinc or nickel ions in the electrolyte may range from about 0.1 M to about 0.4M. Useful nickel sources include nickel sulfate, nickel chloride, nickel acetate, nickel phosphate, derivatives thereof, hydrates thereof or combinations thereof.

Examples of suitable tin sources include soluble tin compounds. A soluble tin compound can be a stannic or stannous salt. The stannic or stannous salt can be a sulfate, an alkane sulfonate, or an alkanol sulfonate. For example, the bath soluble tin compound can be one or more stannous alkane sulfonates of the formula:

where R is an alkyl group that includes from one to twelve carbon atoms. The stannous alkane sulfonate can be stannous methane sulfonate with the formula:

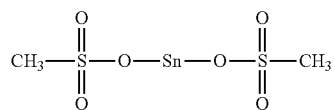

The bath soluble tin compound can also be stannous sulfate of the formula: $SnSO_4$ Examples of the soluble tin compound can also include tin(II) salts of organic sulfonic acid such as methanesulfonic acid, ethanesulfonic acid, 2-propanolsulfonic acid, p-phenolsulfonic acid and like, tin(II) borofluoride, tin(II) sulfosuccinate, tin(II) sulfate, tin(II) oxide, tin(II) chloride and the like. These soluble tin(II) compounds may be used alone or in combination of two or more kinds.

Example of suitable cobalt source may include cobalt salt selected from cobalt sulfate, cobalt nitrate, cobalt chloride, cobalt bromide, cobalt carbonate, cobalt acetate, ethylene diamine tetraacetic acid cobalt, cobalt (II) acetyl acetonate, cobalt (III) acetyl acetonate, glycine cobalt (III), and cobalt pyrophosphate, or combinations thereof.

In one embodiment, the plating solution contains free copper ions in place of copper source compounds and complexed copper ions.

The columnar metal layer 306 is formed using a diffusion limited deposition process. The current densities of the deposition bias are selected such that the current densities are above the limiting current ($i_L$). When the limiting current is reached the columnar metal film is formed due to the evolution of hydrogen gas and resulting dendritic type film growth that occurs due to the mass transport limited process. During formation of the columnar metal layer, the deposition bias generally has a current density of about 10 A/cm$^2$ or less, preferably about 5 A/cm$^2$ or less, more preferably at about 3 A/cm$^2$ or less. In one embodiment, the deposition bias has a current density in the range from about 0.05 A/cm$^2$ to about 3.0 A/cm$^2$. In another embodiment, the deposition bias has a current density between about 0.1 A/cm$^2$ and about 0.5 A/cm$^2$. In yet another embodiment, the deposition bias has a current density between about 0.05 A/cm$^2$ and about 0.3 A/cm$^2$. In yet another embodiment, the deposition bias has a current density between about 0.05 A/cm$^2$ and about 0.2 A/cm$^2$. In one embodiment, this results in the formation of a columnar metal layer between about 1 micron and about 300 microns thick on the copper seed layer. In another embodiment, this results in the formation of a columnar metal layer between about 10 microns and about 30 microns. In yet another embodiment, this results in the formation of a columnar metal layer between about 30 microns and about 100 microns. In yet another embodiment, this results in the formation of a columnar metal layer between about 1 micron and about 10 microns, for example, about 5 microns.

In one embodiment, the columnar metal layer 306 may be deposited using a multi-step plating process. For example, the multi-step plating process may use different current densities for each step.

The fifth process step 210 includes forming porous conductive dendritic structure 308 on the columnar metal layer 306. The porous conductive dendritic structure 308 may be formed on the columnar metal layer 306 by increasing the voltage and corresponding current density from the deposition of the columnar metal layer. The deposition bias generally has a current density of about 10 A/cm$^2$ or less, preferably about 5 A/cm$^2$ or less, more preferably at about 3 A/cm$^2$ or less. In one embodiment, the deposition bias has a current density in the range from about 0.3 A/cm$^2$ to about 3.0 A/cm$^2$. In another embodiment, the deposition bias has a current density in the range of about 1 A/cm$^2$ and about 2 A/cm$^2$. In yet another embodiment, the deposition bias has a current density in the range of about 0.5 A/cm$^2$ and about 2 A/cm$^2$. In yet another embodiment, the deposition bias has a current density in the range of about 0.3 A/cm$^2$ and about 1 A/cm$^2$. In yet another embodiment, the deposition bias has a current density in the range of about 0.3 A/cm$^2$ and about 2 A/cm$^2$. In one embodiment, the porous conductive dendritic structure 308 has a porosity of between 30% and 70%, for example, about 50%, of the total surface area.

In one embodiment, the porous conductive dendritic structure 308 may comprise one or more of various forms of porosities. In one embodiment, the porous conductive dendritic structure 308 comprises a macro-porous dendritic structure having pores of about 100 microns or less, wherein the non-porous portion of the macro-porous dendritic structure has pores of between about 2 nm to about 50 nm in diameter (meso-porosity). In another embodiment, the porous dendritic structure 308 comprises a macro-porous dendritic structure having pores of about 30 microns. Additionally, surfaces of the porous dendritic structure 308 may comprise nano-structures. The combination of micro-porosity, meso-porosity, and nano structure yields a significant increase in the surface area of the porous dendritic structure 308.

In one embodiment, the porous dendritic structure 308 may be formed from a single material, such as copper, zinc, nickel, cobalt, palladium, platinum, tin, ruthenium, lithium, and other suitable material. In another embodiment, the porous dendritic structure 308 may comprise alloys of copper, zinc, nickel, cobalt, palladium, platinum, tin, ruthenium, lithium, combinations thereof, or other suitable materials. In one embodiment, the porous dendritic structure 308 comprises a copper-tin alloy.

Figure 3A:
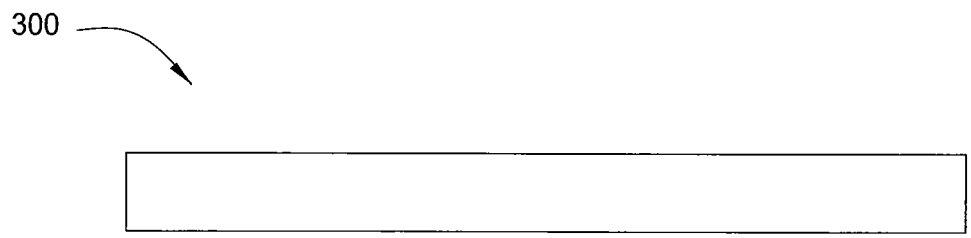
FIGS. 3A-3G are schematic cross-sectional views of an anode formed according to embodiments described herein.
Figure 3B:
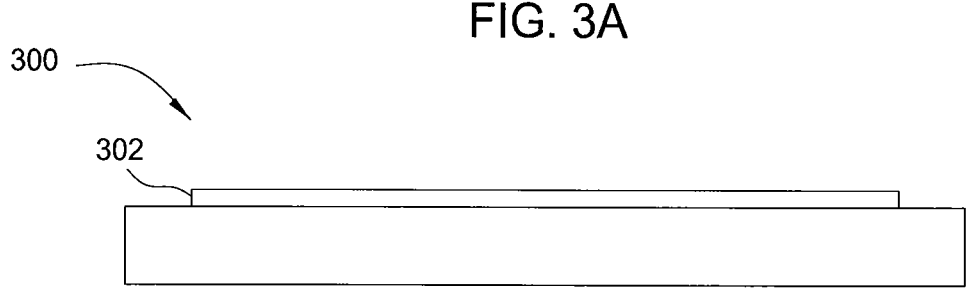
Figure 3C:
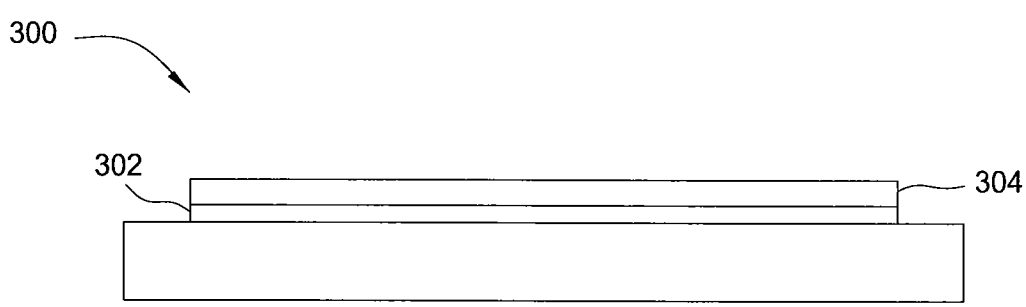
Figure 3D:
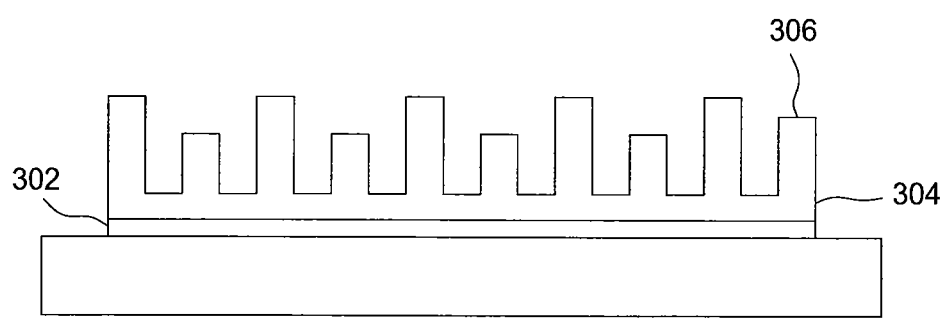
Figure 3E:
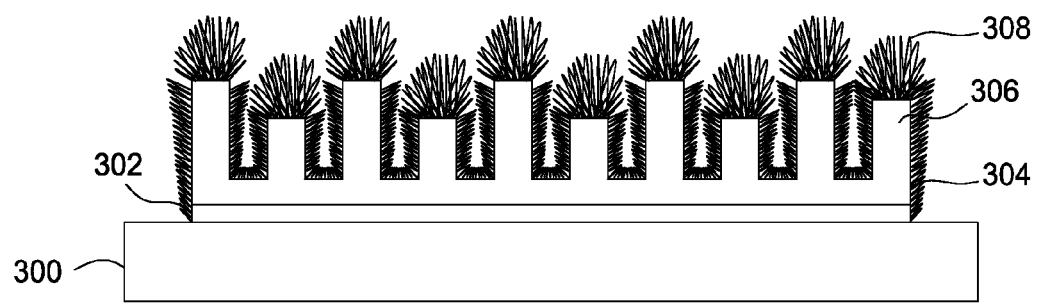
Figure 3F:
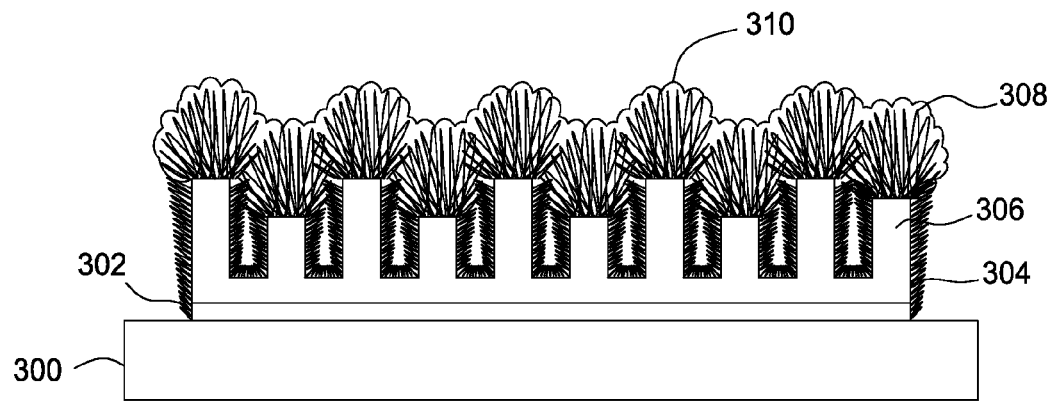

Optionally, a sixth processing step 212 can be performed to form an additional layer or passivation layer 310 on the porous dendritic structure 308, as shown in FIG. 3F. In one embodiment, the passivation layer 310 has a thickness between about 1 nm and about 1000 nm. In another embodiment, the passivation layer 310 has a thickness between about 200 nm and about 800 nm. In yet another embodiment, the passivation layer 310 has a thickness between about 400 nm and about 600 nm. In one embodiment, the passivation layer 310 is a copper containing layer selected from the group comprising copper oxides ($Cu_2O$, $CuO$, $Cu_2O$—$CuO$), copper-chlorides ($CuCl$), copper-sulfides ($Cu_2S$, $CuS$, $Cu_2S$—$CuS$), copper-nitriles, copper-carbonates, copper-phosphides, copper-tin oxides, copper-cobalt-tin oxides, copper-cobalt-tin-titanium oxides, copper-silicon oxides, copper-nickel oxides, copper-cobalt oxides, copper-cobalt-tin-titanium oxides, copper-cobalt-nickel-aluminum oxides, copper-titanium oxides, copper-manganese oxides, and copper-iron phosphates. In one embodiment, the passivation layer 310 is an aluminum containing layer such as an aluminum-silicon layer. In one embodiment, the passivation layer 310 is a lithium containing layer selected from the group comprising lithium-copper-phosphorous-oxynitride (P—O—N), lithium-copper-boron-oxynitride (B—O—N), lithium-copper-oxides, lithium-copper-silicon oxides, lithium-copper-nickel oxides, lithium-copper-tin oxides, lithium-copper-cobalt oxides, lithium-copper-cobalt-tin-titanium oxides, lithium-copper-cobalt-nickel-aluminum oxides, lithium-copper-titanium oxides, lithium-aluminum-silicon, lithium-copper-manganese oxides, and lithium-copper-iron-phosphides. In one embodiment, lithium is inserted into the lithium containing layers after the first charge. In another embodiment, lithium is inserted into the passivation layer by exposing the passivation layer to a lithium containing solution. In one embodiment, lithium is deposited using a plasma spraying process.

In one embodiment, the additional structures or layers 310 may comprise a metal or metal alloy layer. The layer 310 may comprise a material selected from the group consisting of tin, cobalt, and combinations thereof. The layer 310 can be formed by an electrochemical plating process. The layer 310 provides high capacity and long cycle life for the electrode to be formed. In one embodiment, the porous structure 308 comprises copper and tin alloy and the layer 310 comprises a tin layer. In another embodiment, the porous structure 308 comprises cobalt and a tin alloy. In one embodiment, the layer 310 may be formed by immersing the substrate 300 in a new plating bath configured to plate the layer 310 after a rinsing step.

The electrode structure can be of any shape (e.g., circular, square, rectangle, polygonal, etc.) and size. Also, the type of electrode material is not limiting and can be made of any material that is conductive or that can be made conductive, such as a metal, plastic, graphite, polymers, carbon-containing polymer, composite, or other suitable materials. More specifically, the electrode material may comprise, for example, copper, zinc, nickel, cobalt, palladium, platinum, tin, ruthenium, stainless steel, alloys thereof, and combinations thereof. In one embodiment, it is desirable to form an electrode out of a light weight and inexpensive plastic material, such as polyethylene, polypropylene or other suitable plastic or polymeric material.

Optionally, a seventh processing step can be performed to anneal the substrate. During the annealing process, the substrate may be heated to a temperature in a range from about 100° C. to about 250° C., for example, between about 150° C. and about 190° C. Generally, the substrate may be annealed in an atmosphere containing at least one anneal gas, such as $O_2$, $N_2$, $NH_3$, $N_2H_4$, NO, $N_2O$, or combinations thereof. In one embodiment, the substrate may be annealed in ambient atmosphere. The substrate may be annealed at a pressure from about 5 Torr to about 100 Torr, for example, at about 50 Torr. In certain embodiments, the annealing process serves to drive out moisture from the pore structure. In certain embodiments, the annealing process serves to diffuse atoms into the copper base, for example, annealing the substrate allows tin atoms to diffuse into the copper base, making a much stronger copper-tin layer bond.

Figure 2B:
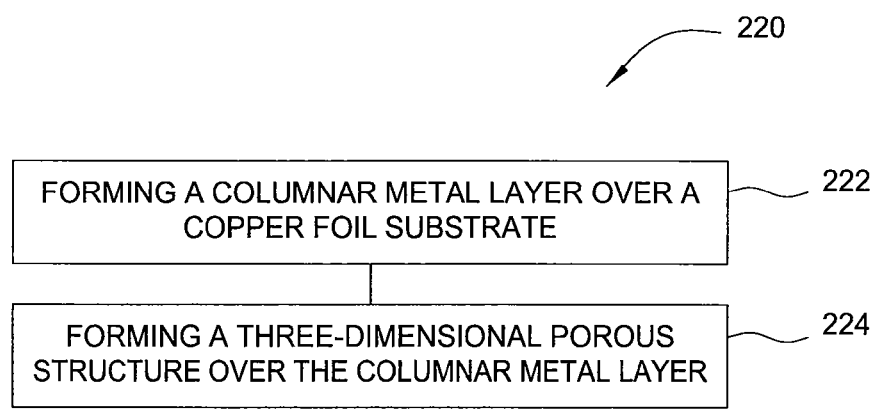
FIG. 2B is a flow diagram of a method of forming an anode according to embodiments described herein.
Figure 3G:
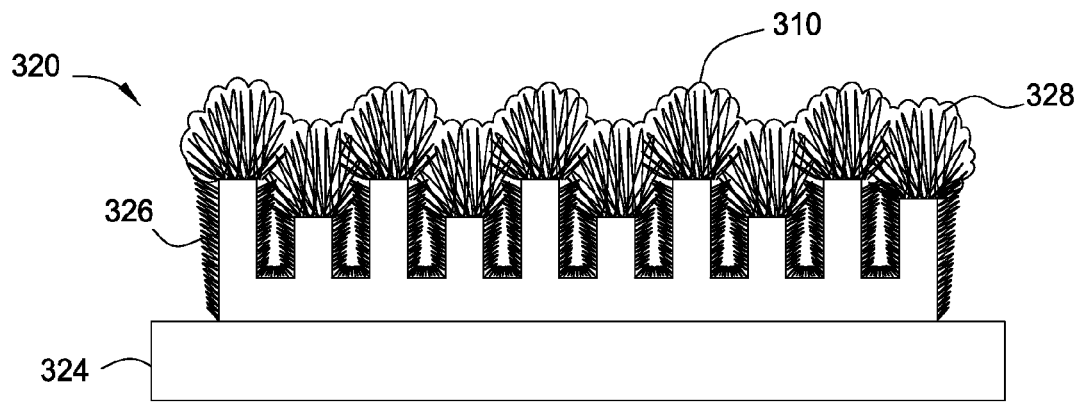

FIG. 2B is a flow diagram of a method 220 of forming an anode according to embodiments described herein. FIG. 3G is a schematic cross-sectional view of an electrode 320 similar to electrode formed according to the embodiments described in FIG. 2B. At box 222, a columnar metal layer 326 similar to columnar metal layer 306 is formed over a copper foil substrate 324. At box 224, a three-dimensional porous dendritic structure 328 similar to three dimensional porous dendritic structure 308 is formed over the copper foil substrate 324.

Certain embodiments described herein further include lithiated electrodes and processes for forming lithiated electrodes by the application of a pre-lithiation process to the electrodes described herein. In one embodiment, the pre-lithiation process may be performed by adding a lithium source to the aforementioned plating solutions. Suitable lithium sources include but are not limited to $LiH_2PO_4$, LiOH, $LiNO_3$, $LiCH_3COO$, LiCl, $Li_2SO_4$, $Li_3PO_4$, $Li(C_5H_8O_2)$, lithium surface stabilized particles (e.g. carbon coated lithium particles), and combinations thereof. The pre-lithiation process may further comprise adding a complexing agent, for example, citric acid and salts thereof to the plating solution. In one embodiment, the pre-lithiation process results in an electrode comprising about 1-40 atomic percent lithium. In another embodiment, the pre-lithiation process results in an electrode comprising about 10-25 atomic percent lithium.

In certain embodiments, the pre-lithiation process may be performed by applying lithium to the electrode in a particle form using powder application techniques including but not limited to sifting techniques, electrostatic spraying techniques, thermal or flame spraying techniques, fluidized bed coating techniques, slit coating techniques, roll coating techniques, and combinations thereof, all of which are known to those skilled in the art.

EXAMPLES

The following hypothetical non-limiting examples are provided to further illustrate embodiments described herein. However, the examples are not intended to be all inclusive and are not intended to limit the scope of the embodiments described herein.

Copper

Example #1

A substrate was placed in an electroplating chamber comprising a Pt(Ti) anode with a surface area of about 3 cm². A three dimensional porous copper electrode was formed in a plating solution initially comprising 1.0 M sulfuric acid, 0.28 M copper sulfate, and 200 ppm of citric acid. A columnar copper structure was deposited at a current density of about 0.4 A/cm². Three dimensional porous copper structures were deposited on the columnar metal layer at a current density of about 1.3 A/cm². The process was performed at room temperature.

Example #2

A substrate was placed in an electroplating chamber comprising a Pt(Ti) anode with a surface area of about 25 cm². A three dimensional porous copper electrode was formed in a plating solution initially comprising 1.0 M sulfuric acid, 0.28 M copper sulfate, and 200 ppm of citric acid. A columnar copper structure was deposited at a current density of about 0.5 A/cm². Three dimensional copper porous dendritic structures were deposited on the columnar copper structure at a current density of about 1.5 A/cm². The process was performed at room temperature.

Example #3

A substrate was placed in an electroplating chamber comprising a Pt(Ti) anode with a surface area of about 1 m². A three dimensional copper porous electrode was formed in a plating solution initially comprising 1.0 M sulfuric acid, 0.28 M copper sulfate, and 200 ppm of citric acid. A columnar copper structure was deposited at a current density of about 0.5 A/cm². Three dimensional porous dendritic structures were deposited on the columnar copper structure at a current density of about 1.7 A/cm². The process was performed at room temperature.

Example #4

A substrate was placed in an electroplating chamber comprising a Pt(Ti) anode with a surface area of about 1 m². A three dimensional porous copper electrode was formed in a plating solution initially comprising 1.0 M sulfuric acid, 0.28 M copper sulfate, and 200 ppm of citric acid. A columnar copper structure was deposited at a current density of about 0.1 A/cm². Three dimensional porous copper dendritic structures were deposited on the columnar copper structure at a current density of about 1.5 A/cm². The process was performed at room temperature.

Example #5

A substrate was placed in an electroplating chamber comprising a Pt(Ti) anode with a surface area of about 25 cm². A three dimensional porous copper electrode was formed in a plating solution initially comprising 1.0 M sulfuric acid, 0.28 M copper sulfate, and 200 ppm of citric acid. A columnar copper structure was deposited at a current density of about 0.4 A/cm². Three dimensional copper porous dendritic structures were deposited on the columnar porous dendritic structure at a current density of about 2 A/cm². The process was performed at room temperature.

Tin

Example #6

A substrate was placed in an electroplating chamber comprising a Pt(Ti) anode with a surface area of about 25 cm². A three dimensional porous electrode was formed in a plating solution initially comprising 1.0 M sulfuric acid, 0.25 M stannous sulfate, and 200 ppm of citric acid. A columnar tin structure was deposited at a current density of about 0.05 A/cm². Three dimensional porous tin structures were deposited on the columnar tin structure at a current density of about 2 A/cm². The process was performed at room temperature.

Example #7

A substrate was placed in an electroplating chamber comprising a Pt(Ti) anode with a surface area of about 1 m². A three dimensional porous tin electrode was formed in a plating solution initially comprising 1.0 M sulfuric acid, 0.25 M stannous sulfate, and 200 ppm of citric acid. A columnar tin structure was deposited at a current density of about 0.3 A/cm². Three dimensional porous tin structures were deposited on the columnar tin structure at a current density of about 1.5 A/cm². The process was performed at room temperature.

Copper-Tin

Example #8

A substrate was placed in an electroplating chamber comprising a Pt(Ti) anode with a surface area of about 25 cm². A three dimensional porous copper-tin electrode was formed in a plating solution initially comprising 1.0 M sulfuric acid, 0.28 M copper sulfate, 0.15 M stannous sulfate, and 200 ppm of citric acid. A columnar copper-tin alloy structure was deposited at a current density of about 0.1 A/cm². Three dimensional copper-tin alloy porous dendritic structures were deposited on the columnar copper-tin alloy structure at a current density of about 1.0 A/cm². The process was performed at room temperature.

Example #9

A substrate was placed in an electroplating chamber comprising a Pt(Ti) anode with a surface area of about 3 cm². A three dimensional copper-tin porous electrode structure was formed in a plating solution initially comprising 1.0 M sulfuric acid, 0.28 M copper sulfate, 0.23 M stannous sulfate, and 200 ppm of citric acid. A columnar copper-tin structure was deposited at a current density of about 0.2 A/cm². Three dimensional porous copper-tin structures were deposited on the columnar copper-tin structure at a current density of about 1.0 A/cm². The process was performed at room temperature.

Copper-Tin-Cobalt Titanium

Example #10

A substrate comprising a titanium layer was placed in an electroplating chamber comprising a Pt(Ti) anode with a surface area of about 25 cm². A three dimensional copper-tin-cobalt porous electrode was formed in a plating solution initially comprising 1.0 M sulfuric acid, 0.28 M copper sulfate, 0.17 M stannous sulfate, 0.15 cobalt sulfate, and 200 ppm of citric acid. A columnar copper-tin-cobalt structure was deposited at a current density of about 0.06 A/cm². Three dimensional copper-tin-cobalt porous dendritic structures were deposited on the columnar copper-tin-cobalt structure at a current density of about 0.3 A/cm². The process was performed at room temperature.

Example #11

A substrate comprising a titanium layer was placed in an electroplating chamber comprising a Pt(Ti) anode with a surface area of about 25 cm². A three dimensional copper-tin-cobalt porous electrode was formed in a plating solution initially comprising 1.0 M sulfuric acid, 0.28 M copper sulfate, 0.23 M stannous sulfate, 0.21 cobalt sulfate, and 200 ppm of citric acid. A columnar copper-tin-cobalt structure was deposited at a current density of about 0.3 A/cm². Three dimensional copper-tin-cobalt porous dendritic structures were deposited on the columnar copper-tin-cobalt structure at a current density of about 1.5 A/cm². The process was performed at room temperature.

Example #12

A substrate comprising a titanium layer was placed in an electroplating chamber comprising a Pt(Ti) anode with a surface area of about 3 cm². A three dimensional copper-tin-cobalt porous electrode was formed in a plating solution initially comprising 1.0 M sulfuric acid, 0.28 M copper sulfate, 0.23 M stannous sulfate, 0.21 cobalt sulfate, and 200 ppm of citric acid. A columnar copper-tin-cobalt structure was deposited at a current density of about 0.25 A/cm². Three dimensional copper-tin-cobalt porous dendritic structures were deposited on the columnar copper-tin-cobalt structure at a current density of about 2.0 A/cm². The process was performed at room temperature.

Example #13

A substrate comprising a titanium layer was placed in an electroplating chamber comprising a Pt(Ti) anode with a surface area of about 1 m². A three dimensional copper-tin-cobalt porous electrode was formed in a plating solution initially comprising 1.0 M sulfuric acid, 0.28 M copper sulfate, 0.23 M stannous sulfate, 0.20 cobalt sulfate, and 200 ppm of citric acid. A columnar copper-tin-cobalt structure was deposited at a current density of about 0.30 A/cm². Three dimensional copper-tin-cobalt porous dendritic structures were deposited on the columnar copper-tin-cobalt structure at a current density of about 2.0 A/cm². The process was performed at room temperature.

Figure 4A:
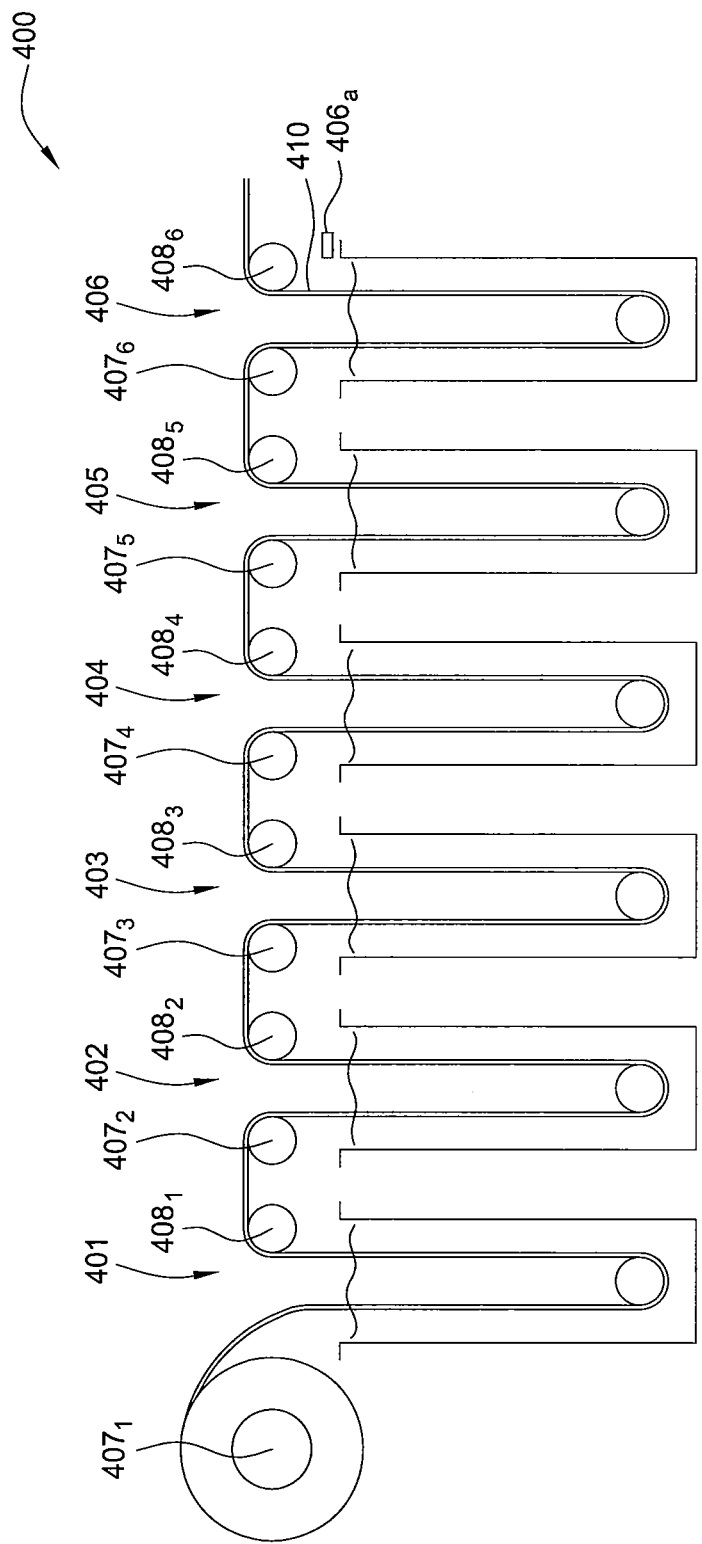
FIG. 4A schematically illustrates one embodiment of a plating system according to embodiments described herein.

Processing System:

FIG. 4A schematically illustrates a plating system 400 using on which the embodiments described herein may be practiced. The plating system 400 generally comprises a plurality of processing chambers arranged in a line, each configured to perform one processing step to a substrate formed on one portion of a continuous flexible base 410.

The plating system 400 comprises a pre-wetting chamber 401 configured to pre-wet a portion of the flexible base 410.

The plating system 400 further comprises a first plating chamber 402 configured to perform a first plating process the portion of the flexible base 410 after being pre-wetted. The first plating chamber 402 is generally disposed next to the cleaning pre-wetting station. In one embodiment, the first plating process may be plating a columnar copper layer on a seed layer formed on the portion of the flexible base 410.

The plating system 400 further comprises a second plating chamber 403 disposed next to the first plating chamber 402. The second plating chamber 403 is configured to perform a second plating process. In one embodiment, the second plating process is forming a copper or alloy such as copper-tin porous dendritic structure on the columnar copper layer.

The plating system 400 further comprises a rinsing station 404 disposed next to the second plating chamber 403 and configured to rinse and remove any residual plating solution from the portion of flexible base 410 processed by the second plating chamber 403.

The plating system 400 further comprises a third plating chamber 405 disposed next to the rinsing station 404. The third plating chamber 405 is configured to perform a third plating process. In one embodiment, the third plating process is forming a thin film over the porous layer. In one embodiment, the thin film is a tin layer.

The plating system 400 further comprises a rinse-dry station 406 disposed next to the third plating chamber 405 and configured to rinse and dry the portion of flexible base 410 after the plating processes. In one embodiment, the rinse-dry station 406 may comprise one or more vapor jets 406a configured to direct a drying vapor toward the flexible base 410 as the flexible base 410 exits the rinse-dry chamber 406.

The processing chambers 401-406 are generally arranged along a line so that portions of the flexible base 410 can be streamlined through each chamber through feed rolls $407_{1-6}$ and take up rolls $408_{1-6}$ of each chamber. In one embodiment, the feed rolls $407_{1-6}$ and take up rolls $408_{1-6}$ may be activated simultaneously during substrate transferring step to move each portion of the flexible base 410 one chamber forward. Other details of the plating system are disclosed in U.S. Ser. No. 61/117,535, titled APPARATUS AND METHOD FOR FORMING 3D NANOSTRUCTURE ELECTRODE OF AN ELECTROCHEMICAL BATTERY AND CAPACITOR, to Lopatin et al., filed Nov. 18, 2009, of which FIGS. 5A-5C, 6A-6E, 7A-7C, and 8A-8D and text corresponding to the aforementioned figures are incorporated by reference.

Figure 4B:
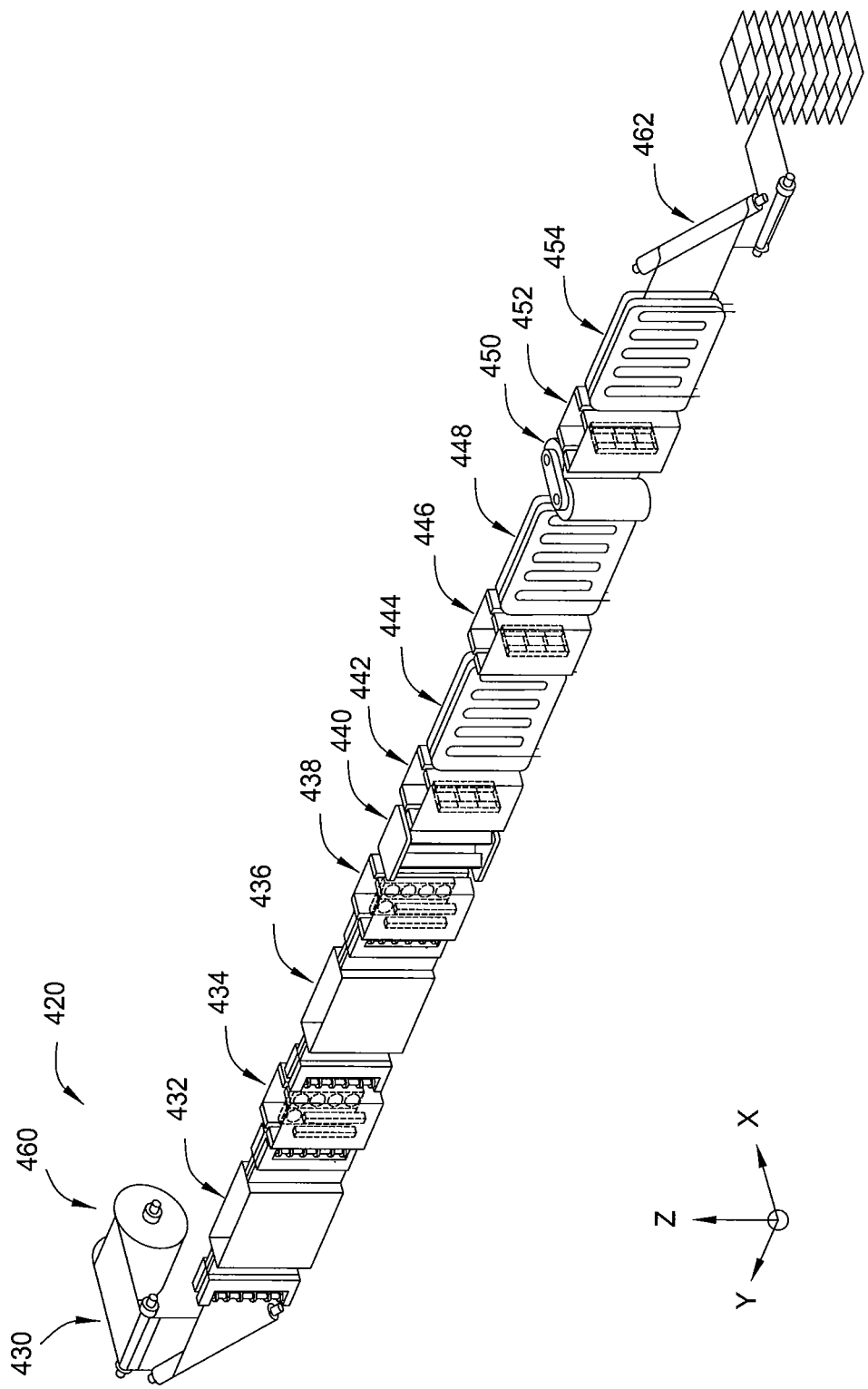
FIG. 4B schematically illustrates one embodiment of a vertical processing system according to embodiments described herein.

FIG. 4B schematically illustrates one embodiment of a vertical processing system 420 according to embodiments described herein. The processing system 420 generally comprises a plurality of processing chambers 432-454 arranged in a line, each configured to perform one processing step to a vertically positioned flexible conductive substrate 430. In one embodiment, the processing chambers 432-454 are stand alone modular processing chambers wherein each modular processing chamber is structurally separated from the other modular processing chambers. Therefore, each of the stand alone modular processing chambers, can be arranged, rearranged, replaced, or maintained independently without affecting each other. In one embodiment, the vertical processing chamber is configured to perform a dual-sided deposition process, e.g., simultaneously process opposite sides of the flexible conductive substrate. Exemplary embodiments of the processing chambers are disclosed in U.S. patent application Ser. No. 11/566,202, titled HIGH-ASPECT RATIO ANODE AND APPARATUS FOR HIGH-SPEED ELECTROPLATING ON A SOLAR CELL SUBSTRATE, to Lopatin et al., filed Dec. 1, 2006, which is hereby incorporated by reference in its entirety.

In one embodiment, the processing system 420 comprises a first plating chamber 432 configured to perform a first plating process, for a example, a copper plating process, on at least a portion of the flexible conductive substrate 430. In one embodiment, the first plating chamber 432 is adapted to plate a copper conductive microstructure over the vertically oriented conductive flexible substrate 430. In one embodiment, the copper conductive microstructure comprises a columnar metal layer with a porous conductive dendritic structure deposited thereon.

In one embodiment, the processing system 420 further comprises a first rinse chamber 434 configured to rinse and remove any residual plating solution from the portion of the vertically oriented conductive flexible substrate 430 with a rinsing fluid, for example, de-ionized water, after the first plating process.

In one embodiment, the processing system 420 further comprises a second plating chamber 436 disposed next to the first rinse chamber 434. In one embodiment, the second plating chamber 436 is configured to perform a second plating process. In one embodiment, the second plating chamber 436 is adapted to deposit a second conductive material, for example, tin, over the vertically oriented conductive flexible substrate 430.

In one embodiment, the processing system 420 further comprises a second rinse chamber 438 configured to rinse and remove any residual plating solution from the portion of the vertically oriented conductive flexible substrate 430 with a rinsing fluid, for example, de-ionized water, after the second plating process. In one embodiment, a chamber 440 comprising an air-knife is positioned adjacent to the second rinse chamber 438.

In one embodiment, the processing system 420 further comprises a first spray coating chamber 442 configured to deposit a powder over and/or into the conductive microstructure on the vertically oriented conductive substrate 430. Although discussed as a spray coating chamber, the first spray coating chamber 442 may be configured to perform any of the aforementioned powder deposition processes.

In one embodiment, the processing system 420 further comprises an annealing chamber 444 disposed adjacent to the first spray coating chamber 442 configured to expose the vertically oriented conductive substrate 430 to an annealing process. In one embodiment, the annealing chamber 444 is configured to perform a drying process such as a rapid thermal annealing process.

In one embodiment, the processing system 420 further comprises a second spray coating chamber 446 positioned adjacent to the annealing chamber 444. Although discussed as a spray coating chamber, the second spray coating chamber 446 may be configured to perform any of the aforementioned powder deposition processes. In one embodiment, the second spray coating chamber is configured to deposit an additive material such as a binder over the vertically oriented conductive substrate 430. In embodiments where a two pass spray coating process is used, the first spray coating chamber 442 may be configured to deposit powder over the vertically oriented conductive substrate 430 during a first pass using, for example, an electrostatic spraying process, and the second spray coating chamber 446 may be configured to deposit powder over the vertically oriented conductive substrate 430 in a second pass using, for example, a slit coating process.

In one embodiment, the processing system 420 further comprises a first drying chamber 448 disposed adjacent to the second spray coating chamber 446 configured to expose the vertically oriented conductive substrate 430 to a drying process. In one embodiment, the first drying chamber 448 is configured to perform a drying process such as an air drying process, an infrared drying process, or a marangoni drying process.

In one embodiment, the processing system 420 further comprises a compression chamber 450 disposed adjacent to the first drying chamber 448 configured to expose the vertically oriented conductive substrate 430 to a calendaring process to compress the deposited powder into the conductive microstructure.

In one embodiment, the processing system 420 further comprises a third spray coating chamber 452 positioned adjacent to the compression chamber 450. Although discussed as a spray coating chamber, the third spray coating chamber 452 may be configured to perform any of the aforementioned powder deposition processes. In one embodiment, the third spray coating chamber 452 is configured to deposit a separator layer over the vertically oriented conductive substrate.

In one embodiment, the processing system 420 further comprises a second drying chamber 454 disposed adjacent to the third spray coating chamber 452 configured to expose the vertically oriented conductive substrate 430 to a drying process. In one embodiment, the second drying chamber 454 is configured to perform a drying process such as an air drying process, an infrared drying process, or a marangoni drying process.

In certain embodiments, the processing system 420 further comprises additional processing chambers. The additional modular processing chambers may comprise one or more processing chambers selected from the group of processing chambers comprising an electrochemical plating chamber, an electroless deposition chamber, a chemical vapor deposition chamber, a plasma enhanced chemical vapor deposition chamber, an atomic layer deposition chamber, a rinse chamber, an anneal chamber, a drying chamber, a spray coating chamber, and combinations thereof. It should also be understood that additional chambers or fewer chambers may be included in the in-line processing system.

The processing chambers 432-454 are generally arranged along a line so that portions of the vertically oriented conductive substrate 430 can be streamlined through each chamber through feed roll 460 and take up roll 462.

In embodiments where a cathode structure is formed, chamber 432 may be replaced with a chamber configured to perform aluminum oxide removal and chamber 436 may be replaced with an aluminum electro-etch chamber.

Rather then using roughened copper as a base for the active anodic material, research is being done on using copper dendrites. We believe this to be the most promising solution.

To grow the dendrites, a technique called electrochemical deposition is used. This process involves immersing a smooth substrate, such as a copper substrate, in a sulfuric acid bath, wherein a potential will eventually be established. The electric potential spike at the anode is great enough that reduction reactions occur. Hydrogen gas bubbles form as a byproduct of the reduction reactions. At the same time, dendrites are constantly being created from Cu grains in the electrolyte. Dendrites end up growing around these bubbles because there is no electrolyte-electrode contact underneath the bubble. In a way, these microscopic bubbles serve as templates for dendritic growth. This is why these anodes have many spherical pores.

As the bubbles rise, they may combine with nearby bubbles (known as coalescence), to form larger dendrite templates. The artifacts remaining from this entire process are (relatively) large pores in the dendritic growth. With the goal of maximizing surface area, it is preferable to minimize the size of these pores. The most intuitive approach involves minimizing bubble coalescence. To do this, the voltage spike is introduced more gradually, as to produce the same amount of sulfuric acid reduction over a longer period of time. When this approach is taken, and the bubble population density is lower because the reduction rate is lower. If the bubble density is lower, less coalescence occurs and the bubbles stay smaller. This has the effect of exposing the dendrite growths to smaller bubble templates, thereby leaving smaller pores on the sample.

Figure 5:
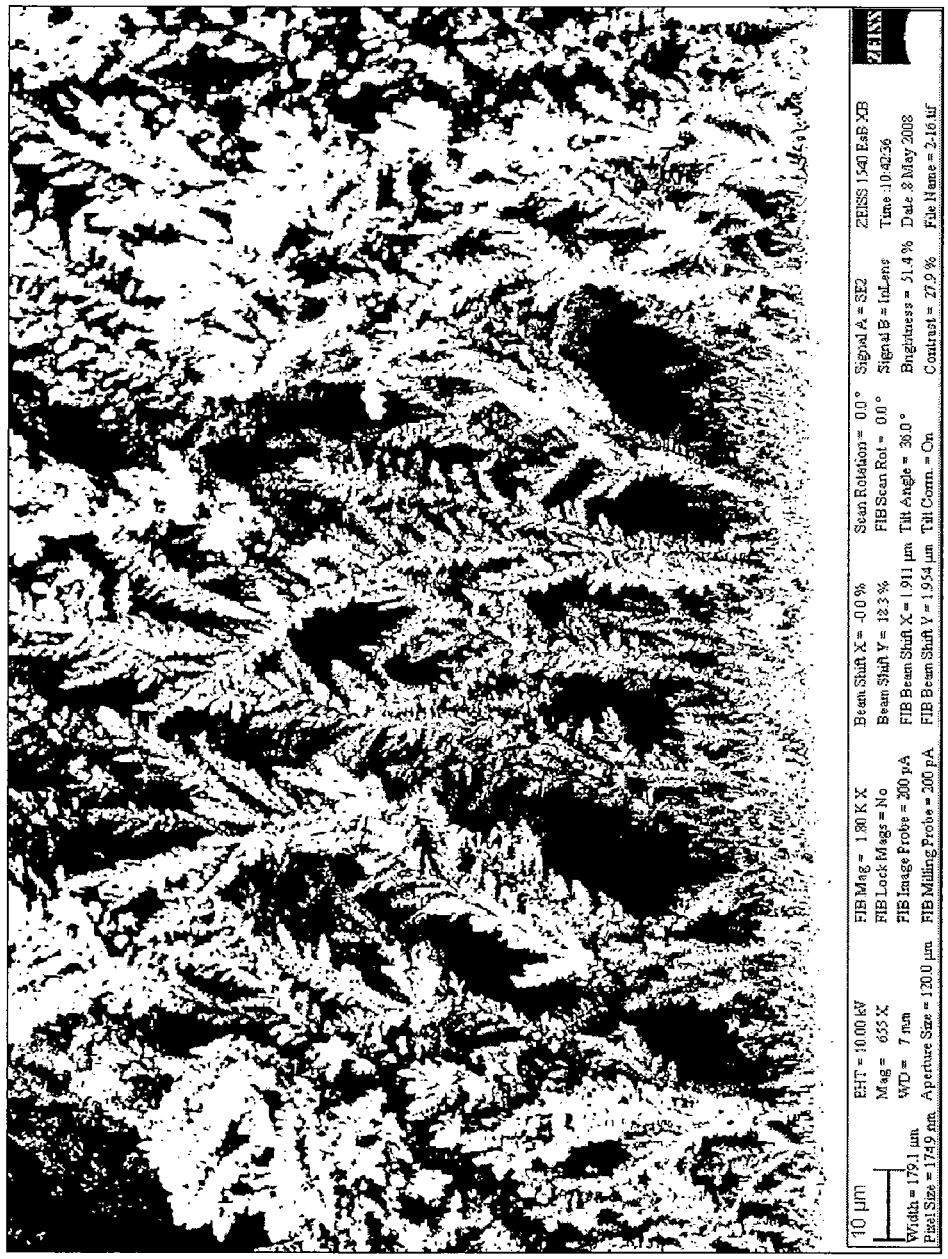
FIG. 5 is a representation of a scanning electron microscope (SEM) image of a three dimensionally plated electrode deposited according to embodiments described herein.

Results:

FIG. 5 is a representation of a scanning electron microscope (SEM) image of a three dimensionally plated electrode deposited according to embodiments described herein. The SEM image was taken at 655× at a 36 degree tile with respect to the lens, trigonometric tilt correction applied. The copper dendrite or "tree" structure was deposited using the electrochemical deposition techniques described herein. The copper dendrite structure is electrically coupled with the substrate resulting in very low resistance from the bottom of the copper tree structure to the top of the structure.

Figure 6:
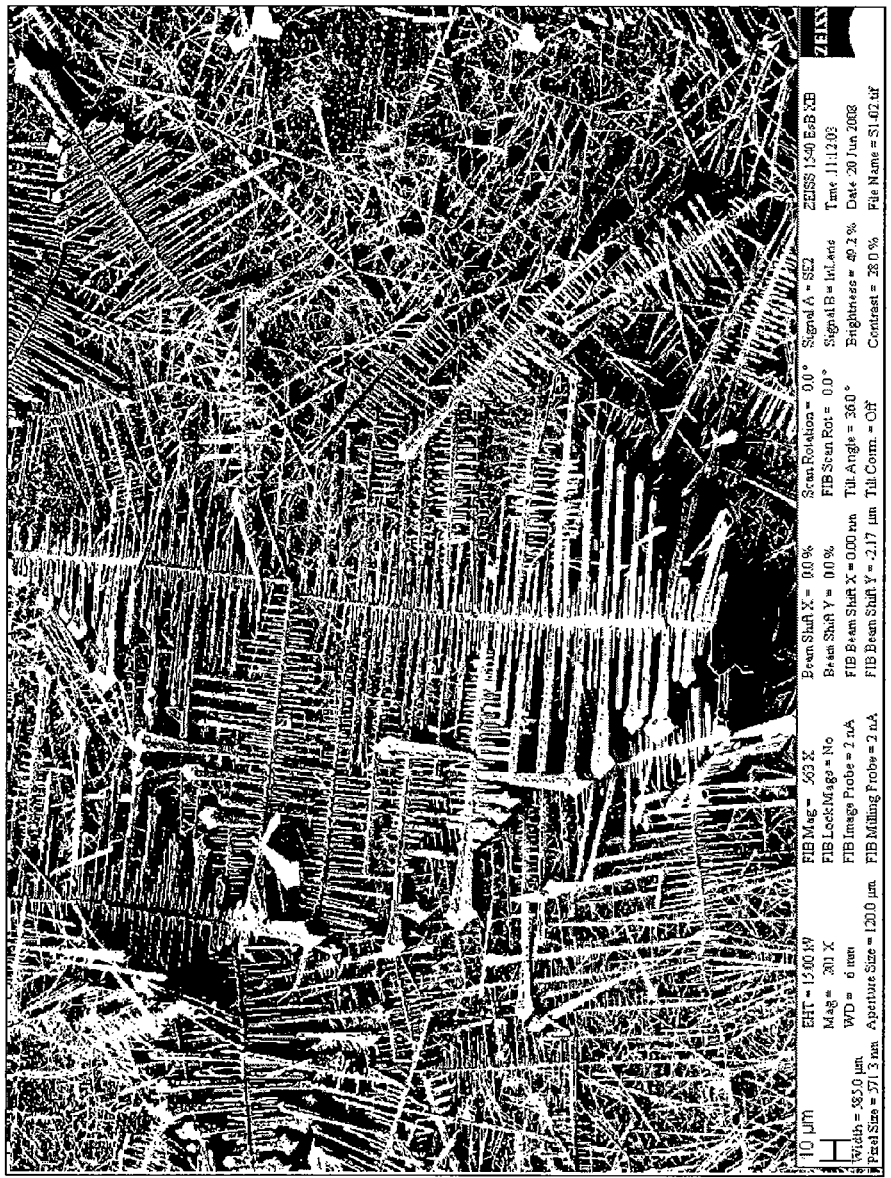
FIG. 6 is a representation of a SEM image of a three dimensionally plated electrode deposited according to embodiments described herein.

FIG. 6 is a representation of a SEM image of a three dimensionally plated electrode deposited according to embodiments described herein. FIG. 6 depicts a schematic representation of tin nano-rod arrays. The SEM image was taken at 201× at a 36 degree tilt with respect to the lens, trigonometric tilt correction applied. The nano-rods are connected to each other and to the substrate thus offering very low resistance.

Figure 7B:
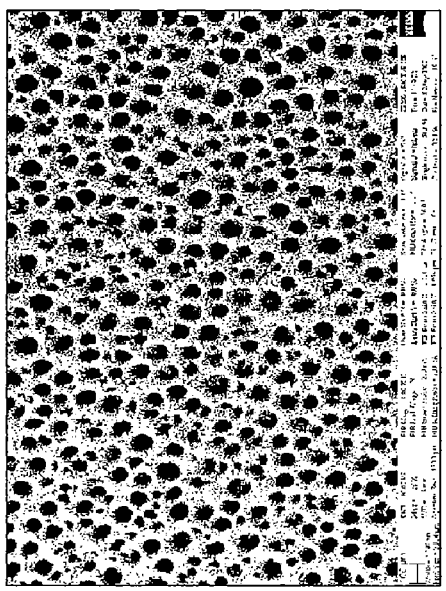
FIGS. 7A-7D are representations of SEM images of three dimensionally plated electrodes deposited according to embodiments described herein.
Figure 7D:
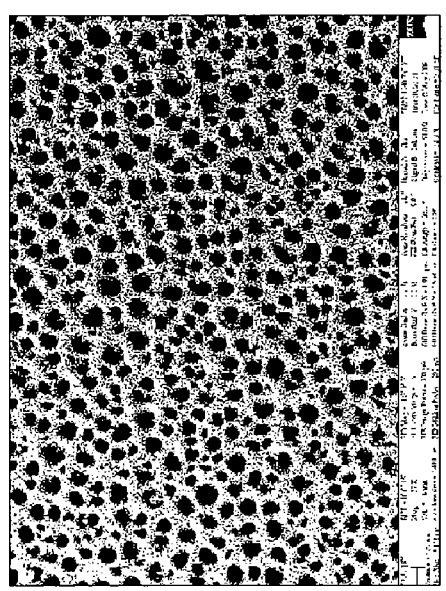
Figure 7A:
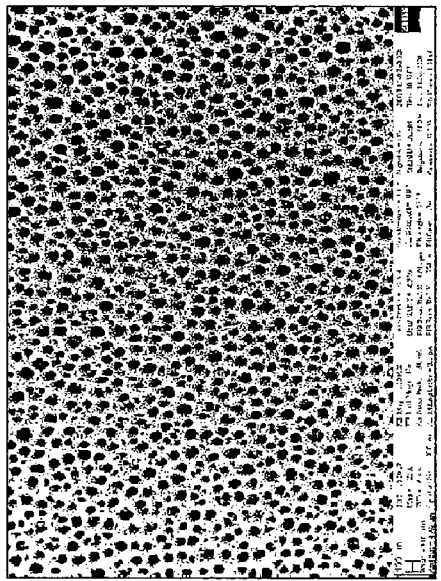
Figure 7C:
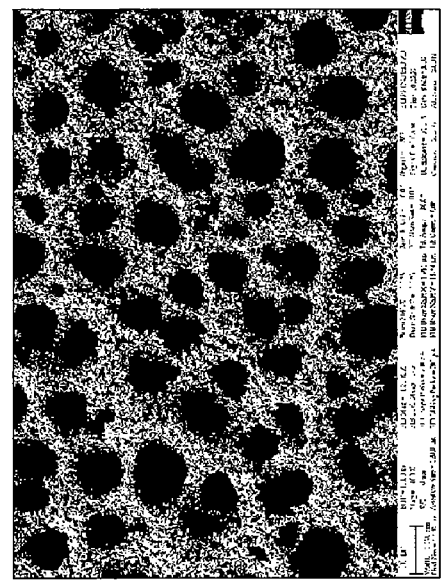

FIGS. 7A-7D are schematic representations of SEM images of three dimensionally plated electrodes deposited according to embodiments described herein. FIG. 7A is a representation of three dimensional copper-tin plated on copper foil. The SEM image was taken at 23× at a 36 degree tilt with respect to the lens, trigonometric tilt correction applied. FIG. 7B is another representation of three dimensional copper-tin plated on copper foil. The SEM image was taken at 38× at a 36 degree tilt with respect to the lens, trigonometric tilt correction applied. FIG. 7C is another representation of three dimensional copper-tin plated on copper foil. The SEM image was taken at 100× at a 36 degree tilt angle with respect to the lens, trigonometric tilt correction applied. FIG. 7D is yet another representation of copper-tin plated on copper foil. The SEM image was taken at 37× at a 36 degree tilt angle with respect to the lens, trigonometric tilt correction applied.

Figure 8:
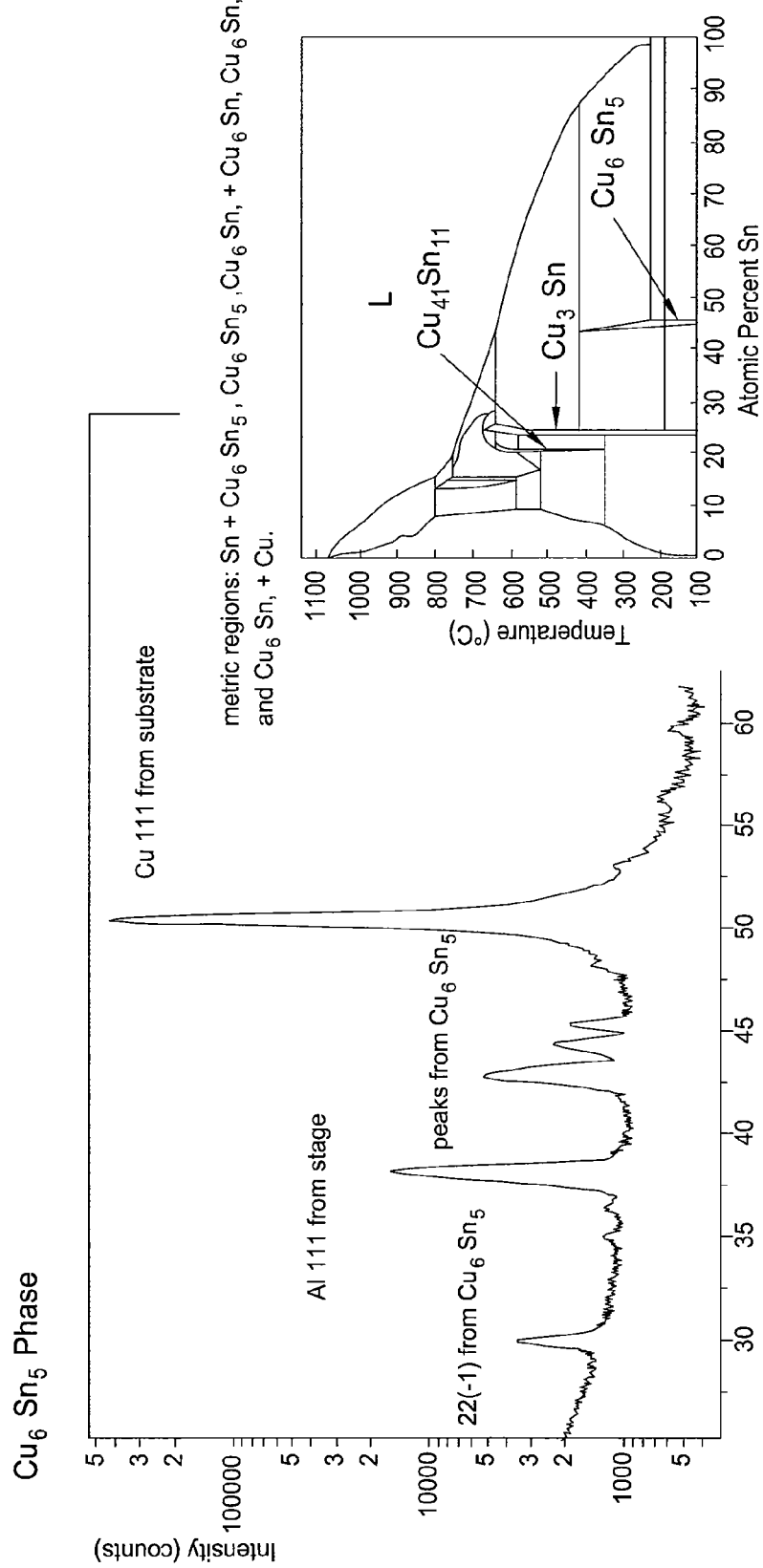
FIG. 8 is X-ray diffraction (XRD) spectra of plated copper-tin and a copper-tin phase diagram.

FIG. 8 is an XRD spectra of plated copper-tin plated according to embodiments described herein and a copper-tin phase diagram. The XRD spectra indicate the presence of $Cu_6Sn_5$ which is the preferred medium for lithium ion absorbing medium.

While the foregoing is directed to embodiments of the present invention, other and further embodiments of the invention may be devised without departing from the basic scope thereof, and the scope thereof is determined by the claims that follow.

The invention claimed is:

1. A battery, comprising:
   a flexible conductive current collector having a smooth surface;
   a porous electrode comprising:
   a columnar metal layer formed on the smooth surface of the flexible conductive current collector;
   a three-dimensional metal macro-porous dendritic structure formed over the columnar metal layer, wherein the three-dimensional metal macro-porous dendritic structure has pores of about 100 microns or less; and
   a tin layer formed on the three-dimensional metal macro-porous dendritic structure; and
   a separator formed over the tin layer formed on the three-dimensional metal macro-porous dendritic structure, wherein the three-dimensional metal macro-porous dendritic structure comprises copper.

2. The battery of claim 1, wherein the three-dimensional metal macro-porous dendritic structure has pores between about 2 nanometers and about 50 nanometers.

3. The battery of claim 2, wherein the three-dimensional metal macro-porous dendritic structure further comprises a tin.

4. The battery of claim 1, wherein the columnar metal layer comprises copper and the columnar metal layer and the three-dimensional metal macro-porous dendritic structure further comprise one or more metals selected from a group consisting of: cobalt, tin, titanium, alloys thereof, and combinations thereof.

5. The battery of claim 1, wherein the flexible conductive current collector comprises a material selected from the group consisting of: copper, aluminum, nickel, zinc, tin, stainless steel, and combinations thereof.

6. The battery of claim 1, wherein the columns of the columnar metal layer comprise dendritic material.

7. The battery of claim 1, wherein the separator is a porous separator.

8. The battery of claim 7, wherein the separator comprises a material selected from the group consisting of: polyolefin, polypropylene, polyethylene, and combinations thereof.

9. The battery of claim 8, wherein the separator further comprises inorganic particles selected from the group consisting of: aluminum oxide, silica, ceramic particles, and combinations thereof embedded in the separator.

10. A battery, comprising:
    a flexible conductive current collector having a smooth surface;
    a porous anode structure comprising:
    a columnar metal layer formed on the smooth surface of the flexible conductive current collector;
    a three-dimensional metal macro-porous dendritic structure formed over the columnar metal layer, wherein the three-dimensional metal macro-porous dendritic structure has pores of about 100 microns or less; and
    a tin layer formed on the three-dimensional metal macro-porous dendritic structure;
    a separator formed over the tin layer formed on the three-dimensional metal macro-porous dendritic structure; and
    a cathode structure, wherein the three-dimensional metal macro-porous dendritic structure comprises copper.

11. The battery of claim 10, wherein the three-dimensional metal macro-porous dendritic structure has pores between about 2 nanometers and about 50 nanometers.

12. The battery of claim 11, wherein the three-dimensional metal macro-porous dendritic structure further comprises a tin.

13. The battery of claim 10, wherein the columnar metal layer comprises copper and the columnar metal layer and the three-dimensional metal macro-porous dendritic structure further comprise one or more metals selected from a group consisting of: cobalt, tin, titanium, alloys thereof, and combinations thereof.

14. The battery of claim 10, wherein the flexible conductive current collector comprises a material selected from the group consisting of: copper, aluminum, nickel, zinc, tin, stainless steel, and combinations thereof.

15. The battery of claim 10, wherein the columns of the columnar metal layer comprise dendritic material.

16. A battery, comprising:
    a flexible conductive current collector having a smooth surface;
    a barrier layer formed on the conductive current collector;
    a porous electrode comprising:
    a columnar metal layer formed on the barrier layer;
    a three-dimensional metal macro-porous dendritic structure formed over the columnar metal layer, wherein the three-dimensional metal macro-porous dendritic structure has pores of about 100 microns or less; and
    a tin layer formed on the three-dimensional metal macro-porous dendritic structure; and
    a separator formed over the tin layer formed on the three-dimensional metal macro-porous dendritic structure, wherein the columnar metal layer and the three-dimensional metal macro-porous dendritic structure comprise copper.

17. The battery of claim 16, wherein the columnar metal layer and the three-dimensional metal macro-porous dendritic structure further comprise a metal selected from a group consisting of cobalt, tin, titanium and combinations thereof.

18. The battery of claim 16, wherein the three-dimensional metal macro-porous dendritic structure has pores between about 2 nanometers and about 50 nanometers.

19. The battery of claim 16, wherein the columns of the columnar metal layer comprise dendritic material.

20. The battery of claim 16, wherein the barrier layer is selected from the group consisting of chromium, tantalum (Ta), tantalum nitride (TaN), titanium (Ti), titanium nitride (TiN), tungsten (W), tungsten nitride (WN), and combinations thereof.

* * * * *

UNITED STATES PATENT AND TRADEMARK OFFICE
CERTIFICATE OF CORRECTION

PATENT NO. : 9,567,683 B2
APPLICATION NO. : 13/486202
DATED : February 14, 2017
INVENTOR(S) : Sergey D. Lopatin et al.

It is certified that error appears in the above-identified patent and that said Letters Patent is hereby corrected as shown below:

On the Title Page

On the page 2, in Column 2, under "Other Publications", Line 3, delete "Reation" and insert -- Reaction --, therefor.

On the page 2, in Column 2, under "Other Publications", Line 13, delete "presentatiion," and insert -- presentation, --, therefor.

In the Specification

In Column 6, Line 18, delete "Kanegaftigi" and insert -- Kanegafuchi --, therefor.

In Column 9, Line 21, delete "1-napthalenesulfonic" and insert -- 1-naphthalenesulfonic --, therefor.

In Column 10, Line 60, after "$SnSO_4$" insert -- . --.

In Column 19, Line 55, delete "then" and insert -- than --, therefor.

In the Claims

In Column 21, Line 23, in Claim 3, after "comprises" delete "a".

In Column 22, Line 11, in Claim 12, before "tin." delete "a".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*